US008269865B2

(12) United States Patent
Yamauchi

(10) Patent No.: US 8,269,865 B2
(45) Date of Patent: Sep. 18, 2012

(54) SIGNAL PROCESSING APPARATUS AND METHOD, IMAGE SENSING APPARATUS AND SYSTEM FOR CORRECTION OF PIXEL SIGNAL OUTPUT BASED ON SIGNAL OUTPUT OF ADJACENT PIXELS AND CALCULATED CORRECTION COEFFICIENT

(75) Inventor: Makiko Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 12/617,394

(22) Filed: Nov. 12, 2009

(65) Prior Publication Data

US 2010/0134660 A1 Jun. 3, 2010

(30) Foreign Application Priority Data

Nov. 28, 2008 (JP) ................................ 2008-305626

(51) Int. Cl.
*H04N 9/64* (2006.01)
*G06K 9/40* (2006.01)

(52) U.S. Cl. ....................................... 348/246; 382/274

(58) Field of Classification Search ............... 348/223.1, 348/241–247; 382/168, 254, 274
See application file for complete search history.

(56) References Cited

U.S. PATENT DOCUMENTS

2007/0146511 A1 6/2007 Kinoshita et al.
2007/0273772 A1 * 11/2007 Shirai ........................ 348/223.1
2009/0122165 A1 * 5/2009 Kinoshita ..................... 348/241

FOREIGN PATENT DOCUMENTS

JP 10-271519 A 10/1998
JP 2004-135206 4/2004
JP 2007-142697 6/2007
JP 2010-016419 A 1/2010
KR 2005-0025272 A 3/2005
KR 2005-0025275 A 3/2005

OTHER PUBLICATIONS

The above references were cited in a Feb. 7, 2012 Korean Office Action, which is enclosed without an English Translation, that issued in Japanese Patent Application No. 10-2009-0113679.
The above reference was cited in a Jul. 27, 2012 Japanese Office Action, a copy of which is enclosed without an English translation, that issued in Japanese Application No. JP2008-305626.

* cited by examiner

*Primary Examiner* — Kelly L Jerabek
(74) *Attorney, Agent, or Firm* — Cowan, Liebowitz & Latman, P.C.

(57) ABSTRACT

A signal processing apparatus performs predetermined signal processing on an image signal output from an image sensor having a pixel array in which a plurality of pixels are arrayed in a direction along a row and a direction along a column. The signal processing apparatus comprises: a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal of the pixel for correction based on an output image signal of adjacent pixels of the pixel for correction and the calculated correction coefficient.

9 Claims, 15 Drawing Sheets

PA300
X3
X1
PC
X2
Xc
X4
31
32
3

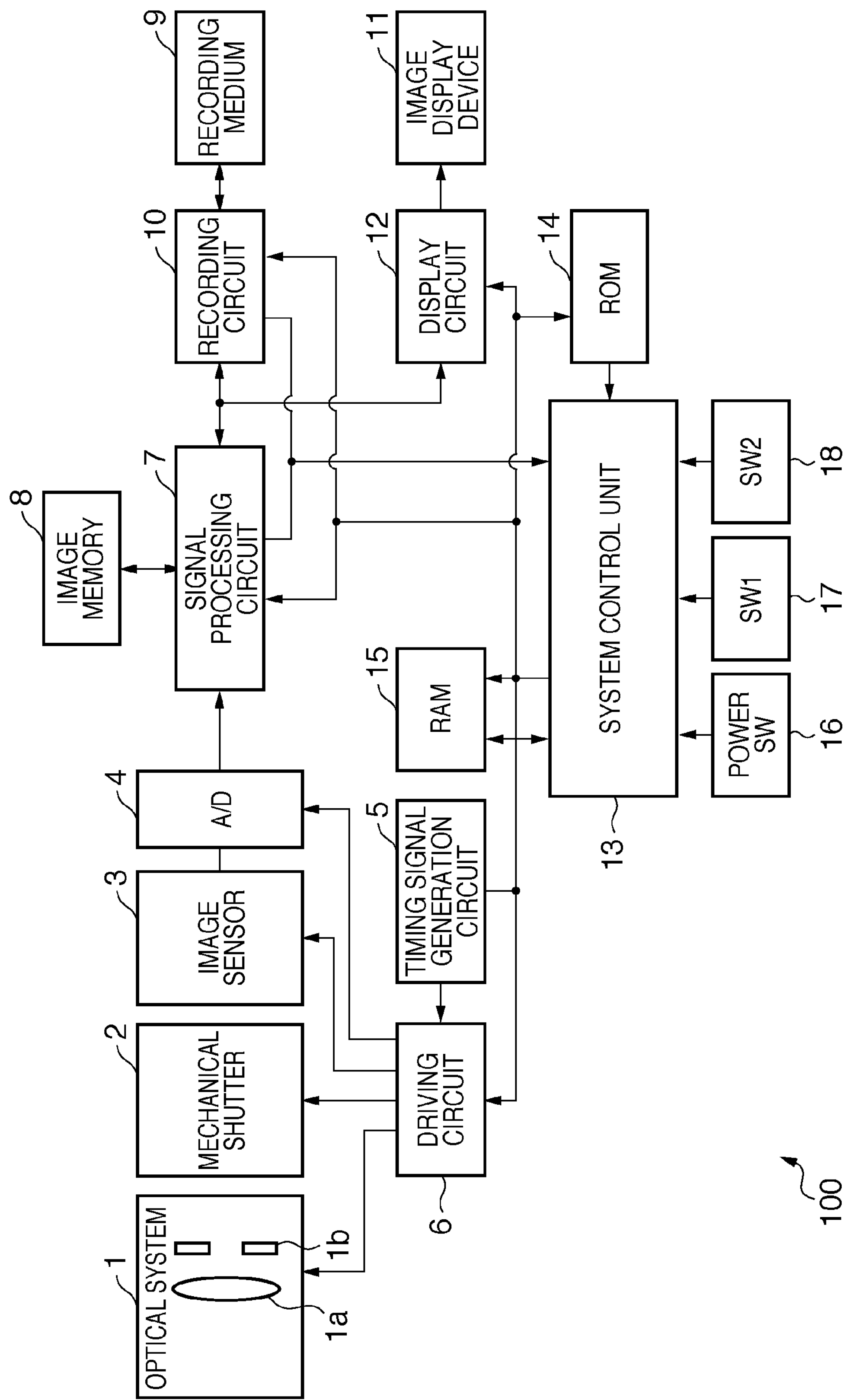
F I G. 1
OPTICAL SYSTEM
1
1a
1b
MECHANICAL SHUTTER
2
IMAGE SENSOR
3
A/D
4
TIMING SIGNAL GENERATION CIRCUIT
5
DRIVING CIRCUIT
6
SIGNAL PROCESSING CIRCUIT
7
IMAGE MEMORY
8
RECORDING MEDIUM
9
RECORDING CIRCUIT
10
IMAGE DISPLAY DEVICE
11
DISPLAY CIRCUIT
12
SYSTEM CONTROL UNIT
13
ROM
14
RAM
15
POWER SW
16
SW1
17
SW2
18
100

F I G. 2
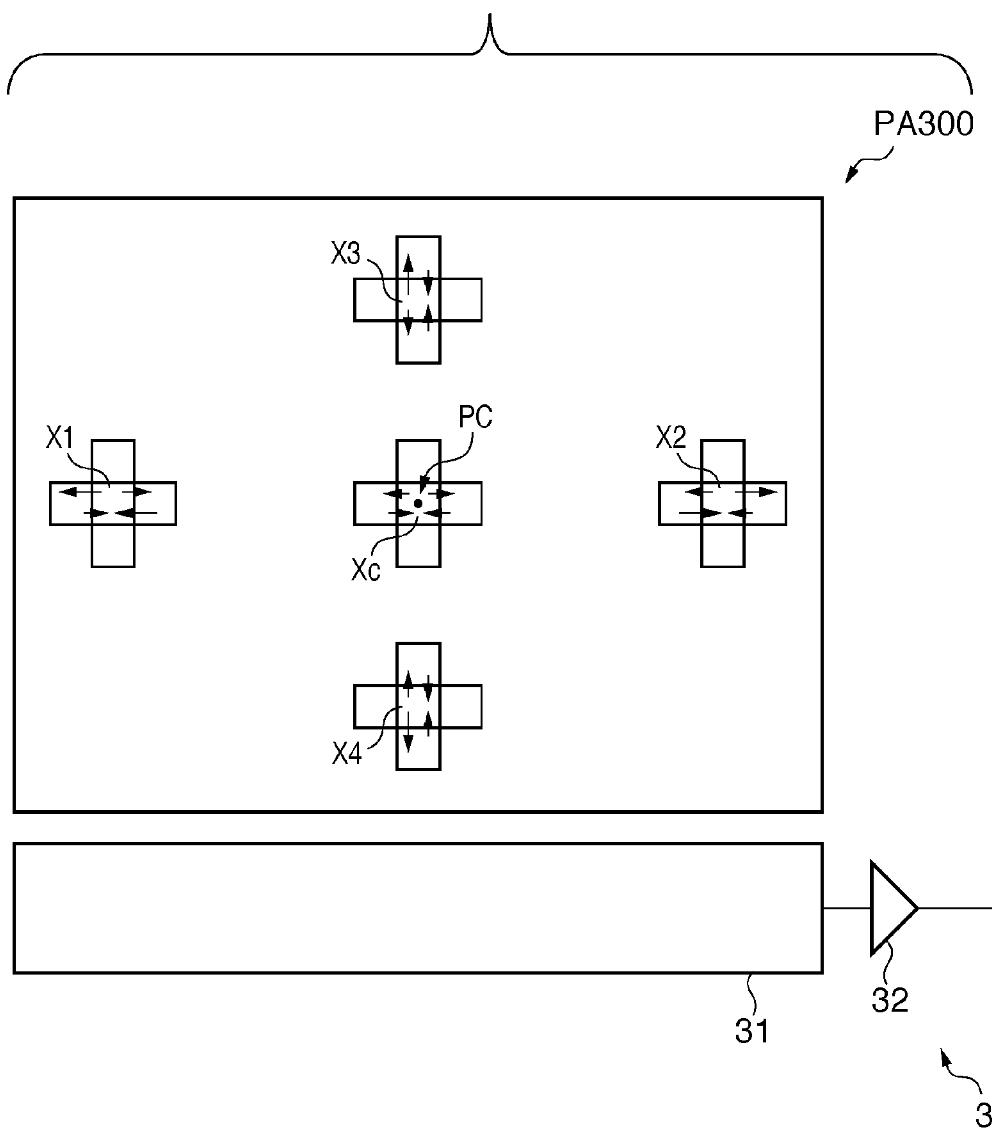

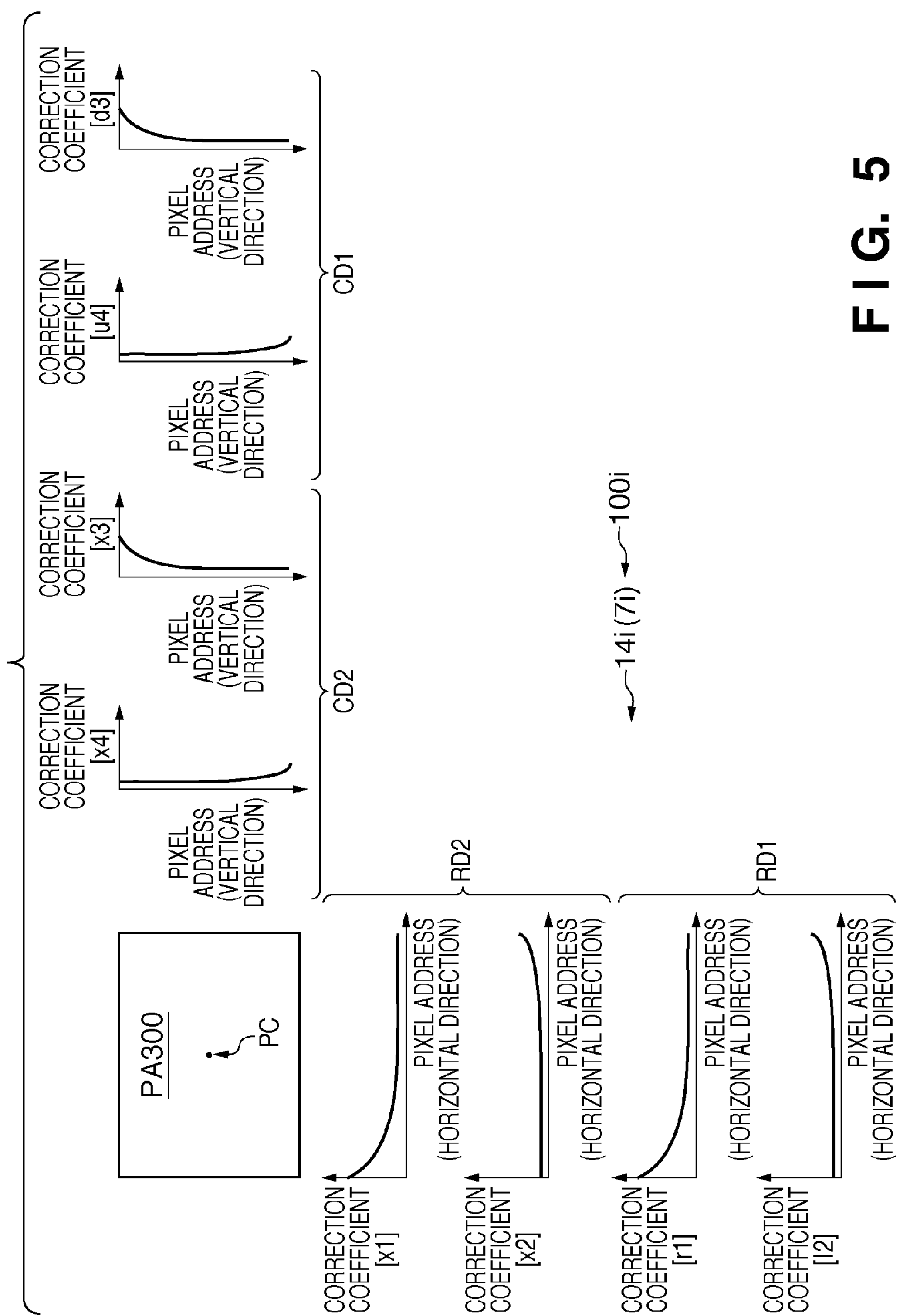
F I G. 5

TABLE OF STOPS (F VALUES) AND COLOR MIXTURE CORRECTION DATA [x1]

PIXEL ADDRESS (HORIZONTAL DIRECTION)

| F VALUE | 1 | 2 | 3 | 4 | 5 | 6 | 7 | 8 | 9 | 10 | ··· |
|---|---|---|---|---|---|---|---|---|---|---|---|
| F1.0 | 0.3 | 0.3 | 0.3 | 0.2 | 0.2 | 0.2 | 0.2 | 0.2 | 0.1 | 0.1 | ··· |
| F1.2 | 0.3 | 0.2 | 0.2 | 0.2 | 0.2 | 0.2 | 0.1 | 0.1 | 0.1 | 0.1 | ··· |
| F1.4 | 0.2 | 0.2 | 0.2 | 0.2 | 0.1 | 0.1 | 0.1 | 0.1 | 0.1 | 0.1 | ··· |
| ⋮ | | | | | | | | | | | |

TABLE OF EXIT PUPIL DISTANCES AND COLOR MIXTURE CORRECTION DATA [x1]

PIXEL ADDRESS (HORIZONTAL DIRECTION)

| EXIT PUPIL DISTANCE | 1 | 2 | 3 | 4 | 5 | 6 | 7 | 8 | 9 | 10 | ··· |
|---|---|---|---|---|---|---|---|---|---|---|---|
| 50mm | 0.3 | 0.3 | 0.3 | 0.2 | 0.2 | 0.2 | 0.2 | 0.2 | 0.1 | 0.1 | ··· |
| 60mm | 0.3 | 0.2 | 0.2 | 0.2 | 0.2 | 0.2 | 0.1 | 0.1 | 0.1 | 0.1 | ··· |
| 70mm | 0.2 | 0.2 | 0.2 | 0.2 | 0.1 | 0.1 | 0.1 | 0.1 | 0.1 | 0.1 | ··· |
| ⋮ | | | | | | | | | | | |

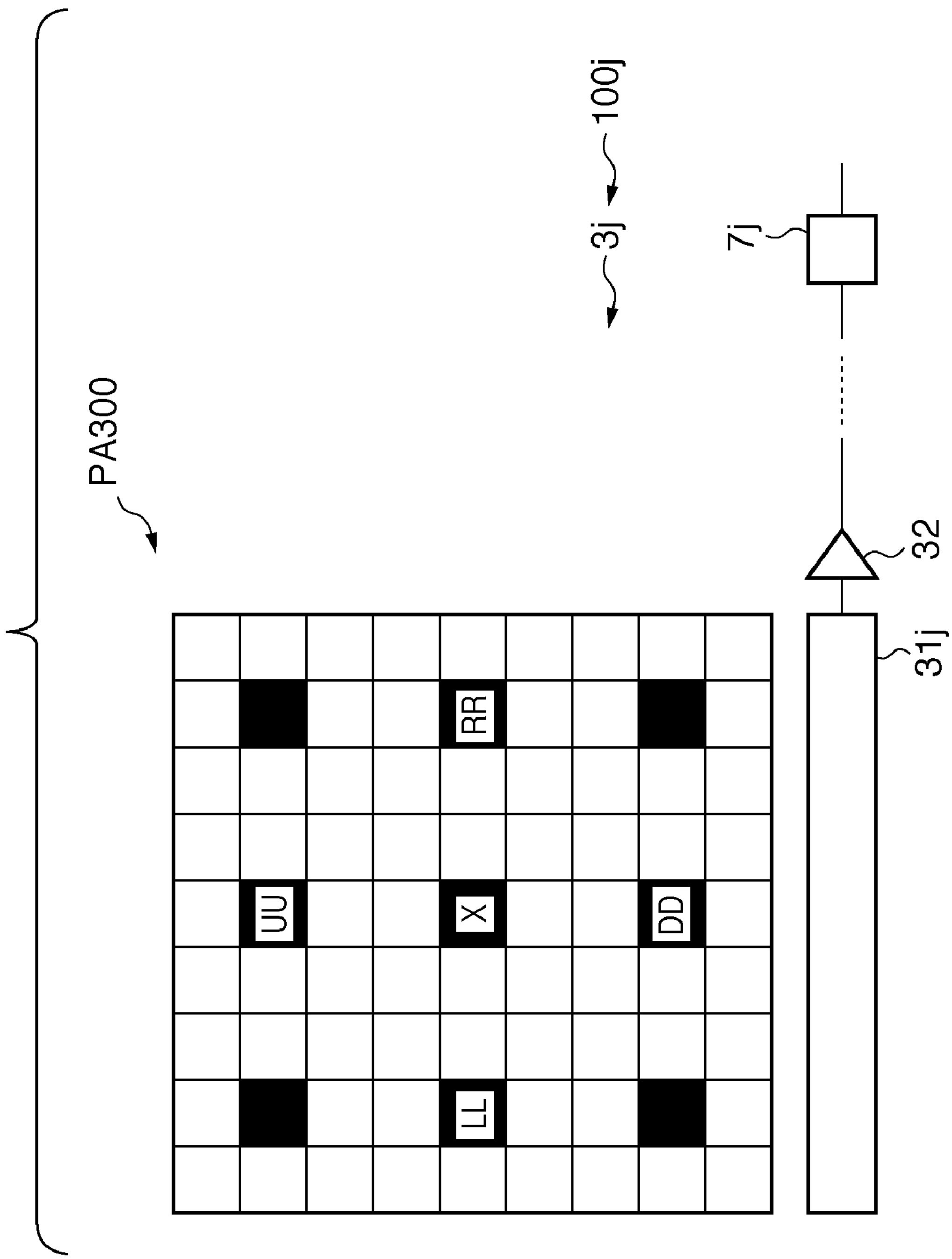
F I G. 9
PA300
3j
100j
7j
32
31j
RR
UU
X
DD
LL

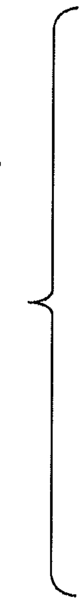
F I G. 19 (PRIOR ART)
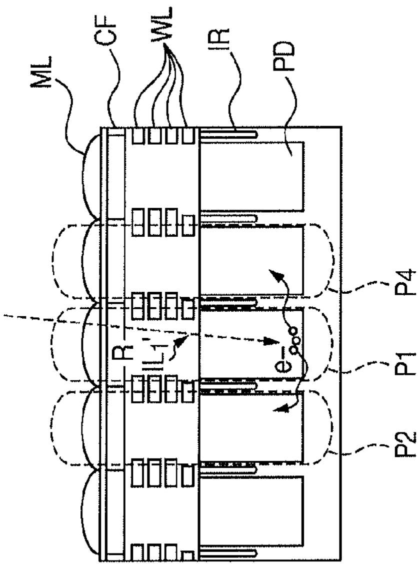
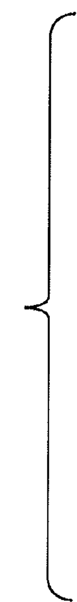
F I G. 18 (PRIOR ART)
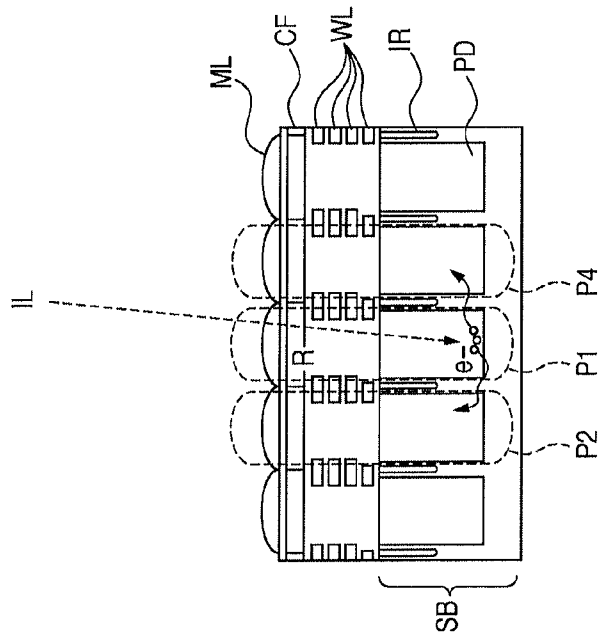

SIGNAL PROCESSING APPARATUS AND METHOD, IMAGE SENSING APPARATUS AND SYSTEM FOR CORRECTION OF PIXEL SIGNAL OUTPUT BASED ON SIGNAL OUTPUT OF ADJACENT PIXELS AND CALCULATED CORRECTION COEFFICIENT

BACKGROUND OF THE INVENTION

1. Field of the Invention

The present invention relates to a signal processing apparatus, image sensing apparatus, image sensing system, and signal processing method.

2. Description of the Related Art

In a conventional image sensing apparatus such as a digital camera or a digital video camera, a CCD image sensor, a CMOS image sensor, or the like is used as an image sensor.

An image sensor IS shown in FIG. 13 is provided with a pixel array PA in which a plurality of pixels are arranged in a direction along a row and a direction along a column. Each of pixels P1 to P5 in the pixel array PA includes a photoelectric conversion unit PD, a color filter CF, and a microlens ML. In each of the pixels P1 to P5, an open area OA between the color filter CF and microlens ML and the photoelectric conversion unit PD is defined by wiring layers WL. The photoelectric conversion units PD of adjacent pixels are electrically separated from each other by an element isolation region IR. The photoelectric conversion units PD and the element isolation regions IR are disposed within a semiconductor substrate SB.

A case is considered in which, in FIG. 13, the color filter CF of the pixel P1 transmits light of a first color, and the color filter CF of the pixel P2 transmits light of a second color. There may be an instance where first color light IL1' among diagonally incident light IL1 on the pixel P1 passes through the open area OA of the pixel P1, and then a portion IL1" of the first color light IL1' is transmitted through the element isolation region IR and arrives at the photoelectric conversion unit PD of the adjacent pixel P2. In this case, although the photoelectric conversion unit PD of the pixel P2 should properly receive the light of the second color, the photoelectric conversion unit PD further receives the first color light IL1" mixed in from the adjacent pixel, and generates a signal corresponding to the first color light IL1". That is, a so-called color mixture phenomenon may occur in which the signals of adjacent pixels interfere with each other.

The ease with which this color mixture occurs differs according to the F value (stop aperture diameter) of a shooting lens in the image sensing apparatus, as shown in FIGS. 14A and 14B. Compared to a case where the stop aperture diameter is small as shown in FIG. 14B, in a case where the stop aperture diameter is large as shown in FIG. 14A, diagonal incident light more easily mixes into an adjacent pixel. That is, as the F value of the shooting lens becomes smaller, the stop aperture diameter becomes larger, and there is a tendency for the amount of diagonal incident light that mixes into an adjacent pixel to increase.

Also, the ease with which color mixture occurs differs according to an exit pupil distance (distance from the image plane to the exit pupil position of the shooting lens) of the shooting lens in the image sensing apparatus, as shown in FIGS. 15A and 15B. Compared to a case where the exit pupil distance is long as shown in FIG. 15A, in a case where the exit pupil distance is short as shown in FIG. 15B, diagonal incident light more easily mixes into an adjacent pixel. That is, as the exit pupil distance becomes shorter, there is a tendency for the amount of diagonal incident light that mixes into an adjacent pixel to increase.

As shown in FIG. 16, the photoelectric conversion unit PD of the pixel P2 receives second color light IL2' that has been transmitted through the color filter CF of the pixel P2 among the incident light IL2 on the pixel P2, and generates charges (signal) according to the received second color light IL2'. Furthermore, the photoelectric conversion unit PD of the pixel P2, which has received the first color light IL1" from the adjacent pixel P1 for the reasons shown in FIGS. 14A, 14B, 15A, and 15B, generates charges (signal) according to the first color light IL1", as shown in FIG. 16. Thus, the photoelectric conversion unit PD of the pixel P2 generates a signal according to the first color light IL1" in addition to a signal according to the second color light IL2', and thereby color mixture occurs.

Also, the ease with which color mixture occurs differs according to the color of light incident on the photoelectric conversion unit PD, as shown in FIGS. 16 and 17. This is because the depth from the surface of the semiconductor substrate SB at the position where light is converted to charges in the photoelectric conversion unit PD differs according to the wavelength of the light. That is, this is because, in comparison to light having a short wavelength, light having a long wavelength is photoelectrically converted at a deeper position in the photoelectric conversion unit PD.

Here, the color filter CF of the pixel P1 shown in FIG. 16 transmits red (R) light, the color filter CF of the pixel P2 transmits green (G) light, and the color filter CF of a pixel P6 shown in FIG. 17 transmits blue (B) light.

As shown in FIG. 16, light that has passed through the red (R) light color filter CF, in comparison to light that has passed through the color filters CF of the other colors (G, B), is photoelectrically converted at a deeper position in the photoelectric conversion unit PD. Therefore, the red (R) light IL1' passes through the photoelectric conversion unit PD of the pixel P1 where that light should be incident, and a portion IL1" of that light easily becomes incident on the photoelectric conversion unit PD of the adjacent pixel P2. The light IL1" that is incident on the photoelectric conversion unit PD of the adjacent pixel P2 is photoelectrically converted there, so without producing charges (signal) of the pixel P1 where the light should be incident, a mixed color component for the signal of the adjacent pixel P2 is generated.

On the other hand, as shown in FIG. 17, light IL6' that has passed through the blue (B) color filter CF, in comparison to light IL1' and IL2' that has passed through the color filters CF of the other colors (R, G), is photoelectrically converted at a shallower position in the photoelectric conversion unit PD. Therefore, even if a light ray IL6 is diagonally incident on the pixel P6, there is a tendency for the light ray to be photoelectrically converted in the photoelectric conversion unit PD of the pixel P6 prior to arriving at the photoelectric conversion unit PD of an adjacent pixel P7. That is, because it is unlikely that the blue (B) light IL6' will pass through the photoelectric conversion unit PD of the pixel P6 where that light should be incident and arrive at the adjacent pixel P7, it is unlikely that a mixed color component for the signal of the adjacent pixel P7 will be generated.

Also, as shown in FIG. 18, at a deep position in the semiconductor substrate SB, between the photoelectric conversion units PD of adjacent pixels, electrical separation by the element isolation region IR is inadequate. Therefore, charges (signal) that are stored at a deep position in the photoelectric conversion unit PD of the pixel P1 are dispersed and mixed into the photoelectric conversion unit PD of the adjacent pixels P2 and P4 at a deep position in the semiconductor substrate SB. This crosstalk within the semiconductor substrate SB also causes color mixture.

The ease with which color mixture due to this crosstalk occurs differs according to the color light that is incident on the photoelectric conversion unit PD, as shown in FIGS. 19 and 20.

As shown in FIG. 19, light IL1' that has passed through the red (R) color filter CF, in comparison to light that has passed through the color filters CF of the other colors (G, B), is photoelectrically converted and stored at a deeper position in the photoelectric conversion unit PD. Therefore, charges (signal) stored in the photoelectric conversion unit PD of the pixel P1 according to the red (R) light IL1' easily passes, at a deep position in the semiconductor substrate SB, through the area deeper than the element isolation region IR and is dispersed in the photoelectric conversion units PD of the adjacent pixels P2 and P4. In the area deeper than the element isolation region IR, it is conceivable that electrical separation is inadequate between the photoelectric conversion units of adjacent pixels. Thus, charges (signal) dispersed in the photoelectric conversion units PD of the adjacent pixels P2 and P4 easily generate mixed color components for the signal of the adjacent pixels P2 and P4, without becoming the charges (signal) of the pixel P1 where the dispersed charges (signal) should be stored.

On the other hand, as shown in FIG. 20, light IL6' that has passed through the blue (B) color filter CF, in comparison to light that has passed through the color filters CF of the other colors (R, G), is photoelectrically converted at a shallower position in the photoelectric conversion unit PD. Therefore, charges (signal) stored in the photoelectric conversion unit PD of the pixel P6 according to the blue (B) light IL6' is blocked, at a shallow position in the semiconductor substrate SB, by the element isolation region IR, and is unlikely to be dispersed into the photoelectric conversion unit PD of an adjacent pixel P8. The charges (signal) stored in the photoelectric conversion unit PD of the pixel P6 according to the blue (B) light IL6' are unlikely to generate mixed color components for the signal of the adjacent pixel P8.

Due to color mixture that occurs in this manner, the image signal that is output from the image sensor deteriorates, and thereby color reproducibility deteriorates.

Japanese Patent Laid-Open No. 2004-135206 describes that, in a CCD image sensing element having a color filter array according to a Bayer array, color mixture correction subtracts, from the signal of a designated color pixel, a fixed ratio calculated from the signal of the designated color pixel and the signal of an adjacent pixel of a color other than the designated color.

In this correction processing, it is assumed that color mixture occurs, relative to a pixel of interest, isotropically from a plurality of surrounding pixels that are adjacent to that pixel of interest, i.e., that a signal component is mixed in at the same ratio from a plurality of surrounding pixels. Under this assumption, a signal component of a fixed ratio is isotropically subtracted.

On the other hand, Japanese Patent Laid-Open No. 2007-142697 describes that, in an actual solid image sensing element, the light receiving face of a photoelectric conversion unit is disposed at an offset position within a pixel, depending on the wiring pattern and the layout of electrodes within the pixel or in the vicinity of the pixel. As a result, the physical center of the pixel and the optical center of the pixel do not match, and thereby color mixture from surrounding pixels relative to the pixel of interest can be made to occur with directionality.

To address this problem, Japanese Patent Laid-Open No. 2007-142697 proposes changing, independent of each other, correction parameters Ka, Kb, Kc, and Kd for correcting color mixture from surrounding pixels respectively at the upper left, upper right, lower left, and lower right. Thus, according to Japanese Patent Laid-Open No. 2007-142697, it is possible to realize correction processing of color mixture that is made to have directionality according to the amount of color mixture from the surrounding pixels.

In Japanese Patent Laid-Open No. 2007-142697, a correction circuit for performing color mixture correction processing receives a control signal of directionality selection supplied from outside via a communications I/F, and changes the correction parameters Ka, Kb, Kc, and Kd independent of each other according to the received directionality selection control signal. Specifically, when the directionality selection control signal that has been supplied from outside via the communications I/F is 0, Ka=Kb=K1, and Kc=Kd=K2 are set. When the directionality selection control signal is 1, Ka=Kc=K1, and Kb=Kd=K2 are set, and when the directionality selection control signal is 2, Ka=Kd=K1, and Kb=Kc=K2 are set. In the correction circuit described in Japanese Patent Laid-Open No. 2007-142697, the correction parameters Ka, Kb, Kc, and Kd used for the respective signals of a plurality of pixels disposed in the solid image sensing element have values that are common to each pixel. However, strictly speaking, in the actual image sensing apparatus, the angle of incident light rays on the pixels differs according to the arrangement of pixels in a sensor face. The amount of color mixture from an adjacent pixel for a pixel of interest differs according to the light ray incidence angle, i.e., the amount of color mixture in each pixel differs according to the pixel arrangement of respective pixels in the sensor face. In the case of such color mixture that occurs in a non-uniform manner in the sensor face, with the correction circuit described in Japanese Patent Laid-Open No. 2007-142697, there is a high possibility that the accuracy of color mixture correction processing will deteriorate according to the position of pixels in the sensor face (pixel array).

SUMMARY OF THE INVENTION

The present invention aims to improve the accuracy of color mixture correction processing for each pixel in a pixel array.

According to a first aspect of the present invention, there is provided a signal processing apparatus that performs predetermined signal processing on an image signal output from an image sensor having a pixel array in which a plurality of pixels are arrayed in a direction along a row and a direction along a column, the signal processing apparatus comprising: a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal of the pixel for correction based on an output image signal of adjacent pixels of the pixel for correction and the calculated correction coefficient.

According to a second aspect of the present invention, there is provided an image sensing apparatus, comprising: an image sensor that has a pixel array in which a plurality of pixels are arrayed in a direction along a row and a direction along a column, and a readout unit that reads out a signal from the pixel array; a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal that has been read out from the pixel for correction by the readout unit based on an output image signal that has been read out from adjacent pixels of the pixel for correction by the readout unit and the calculated correction coefficient.

According to a third aspect of the present invention, there is provided an image sensing system, comprising: an image sensing apparatus that generates image data by performing image sensing of an object; and a processing apparatus that receives the image data from the image sensing apparatus, and processes the received image data; the image sensing apparatus including: an image sensor having a pixel array in which a plurality of pixels are arrayed in a direction along a row and a direction along a column, and a readout unit that reads out a signal from the pixel array; a storage unit that stores characteristic information indicating characteristics of signal component mix in each pixel from adjacent pixels according to the pixel position in the pixel array of the image sensor; and a generation unit that generates the image data by attaching the characteristic information to an image signal that has been read out by the readout unit; the processing apparatus including a correction unit that calculates a correction coefficient according to the position of a pixel for correction from the characteristic information included in the image data, and corrects an output image signal of the pixel for correction in the image data based on an output image signal of adjacent pixels of the pixel for correction and the calculated correction coefficient in the image data.

According to a fourth aspect of the present invention, there is provided a method for signal processing of an image signal that is output from an image sensor in which a plurality of pixels are arrayed in a direction along a row and a direction along a column, the method comprising: a first step of calculating, from characteristic information indicating characteristics of signal component mix in each pixel from adjacent pixels according to the pixel position in a pixel array of the image sensor that has been stored in advance, a correction coefficient according to the position of a pixel for correction in the pixel array; and a second step of correcting an output image signal of the pixel for correction based on an output image signal of adjacent pixels of the pixel for correction and the calculated correction coefficient.

According to the present invention, it is possible to improve the accuracy of color mixture correction processing for each pixel in a pixel array.

Further features of the present invention will become apparent from the following description of exemplary embodiments (with reference to the attached drawings).

BRIEF DESCRIPTION OF THE DRAWINGS

FIG. 1 shows the configuration of an image sensing apparatus 100 according to a first embodiment of the present invention.

FIG. 2 shows the configuration of an image sensor 3 in the first embodiment of the present invention.

FIG. 5 shows a first characteristic of color mixture information and a second characteristic of color mixture information in a second embodiment of the present invention.

FIG. 9 shows the configuration of an image sensor 3*j* in a fourth embodiment of the present invention.

FIG. 18 Illustrates related art.

FIG. 19 Illustrates related art.

DESCRIPTION OF THE EMBODIMENTS

In the present specification, light incidence angle means an angle that the center of gravity of light forms with the normal line of a light incidence face.

Figure 21:
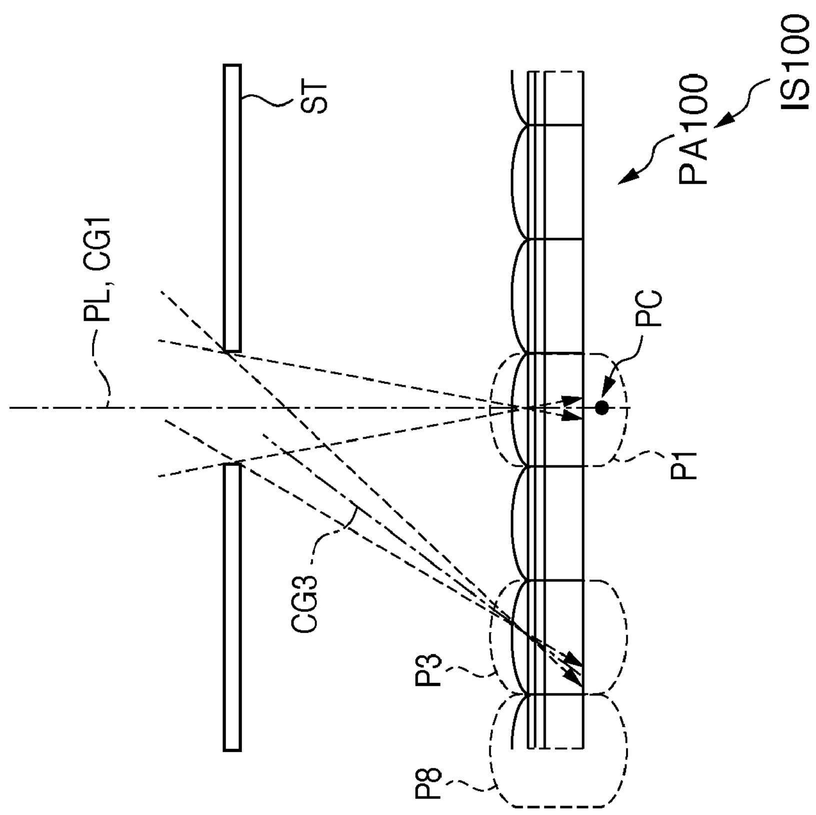
FIG. 21 Illustrates a problem to be solved by the invention.

The present inventors focused their attention on the fact that, as shown in FIG. 21, the incidence angle of a light ray PL incident on each pixel of an image sensor IS100 via an aperture portion of a stop ST differs according to the positional relationship between an optical center PC of a pixel array PA100 and a pixel in the pixel array PA100. The present inventors thought that the ease with which color mixture occurs depends also on the difference in the incidence angle of the light ray on each pixel, i.e., the difference in the position of each pixel in the pixel array PA100.

However, as shown in FIG. 21, with the image sensor IS100 having a large pixel size (pitch), a large difference in color mixture was not found between a pixel P1 positioned at the optical center PC of the pixel array PA100 and a pixel P3 at a position shifted from the optical center PC.

Here, the pixel P1 receives light having a center of gravity CG1 that forms a small incidence angle (≈0°), and the pixel P3 receives light having a center of gravity CG3 that forms a large incidence angle. When the pixel size (pitch) is large, even when there is a light ray (center of gravity CG3) diagonally incident on the pixel P3, which is in a position shifted from the optical center PC, that light ray is unlikely to arrive at an adjacent pixel P8. In other words, because the difference in color mixture due to the difference in the position of each pixel in the pixel array PA100 is sufficiently small relative to the absolute amount of color mixture in each pixel, there is a tendency that the difference in color mixture does not become large enough to cause a problem.

Figure 22:
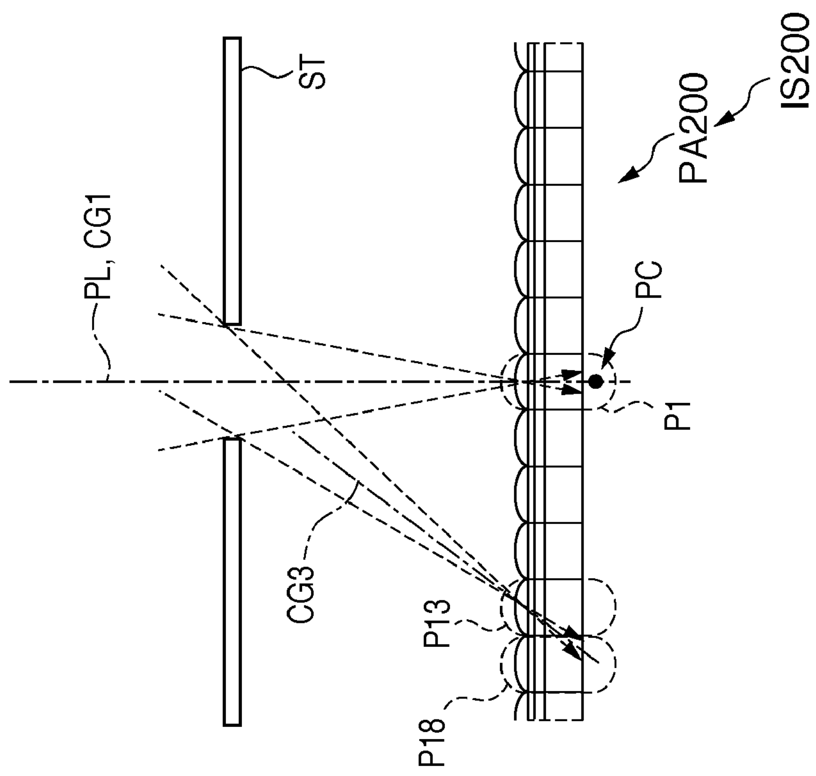
FIG. 22 Illustrates a problem to be solved by the invention.

On the other hand, as shown in FIG. 22, with an image sensor IS200 having a small pixel size (pitch), a large difference in color mixture was found between a pixel P1 positioned at the optical center PC of a pixel array PA200 and a pixel P13 at a position shifted from the optical center PC.

Here, the pixel P1 receives light having a center of gravity CG1 that forms a small incidence angle, and the pixel P13 receives light having a center of gravity CG3 that forms a larger incidence angle. When the pixel size (pitch) is small, a light ray (center of gravity CG3) diagonally incident (at a large incidence angle) on the pixel P13, which is in a position shifted from the optical center PC, easily arrives at an adjacent pixel P18. In other words, because the difference in color mixture due to the difference in the position of each pixel in the pixel array PA200 is large relative to the absolute amount of color mixture in each pixel, there is a tendency that the difference in color mixture becomes large enough to cause a problem so that the difference in color mixture cannot be ignored.

In particular, recently shrinkages in pixel size are advancing, and due to further reducing the size of pixels, as shown in FIG. 22, it is conceivable that the difference in color mixture due to the difference in the position of each pixel in the pixel array PA200 will further increase. Therefore, it is conceivable that the difference in color mixture due to the difference in the position of each pixel in the pixel array PA200 will cause a problem that cannot be ignored, and will have a large effect on color reproducibility.

Next is a description of an image sensing apparatus 100 according to a first embodiment of the present invention, with reference to FIG. 1. FIG. 1 shows the configuration of the image sensing apparatus 100 according to the first embodiment of the present invention.

The image sensing apparatus 100, for example, is a digital camera or a digital video camera. The image sensing apparatus 100 is provided with the following constituent elements.

An optical system 1 includes a lens 1*a* and a stop 1*b*. The lens 1*a* refracts incident light to form an image of an object in a pixel array (image sensing face) of an image sensor 3. The stop 1*b* is provided between the lens 1*a* and the image sensor 3 in an optical path, and adjusts the amount of light guided to the image sensor 3 after passing through the lens 1*a*.

A mechanical shutter 2 is provided between the optical system 1 and the image sensor 3 in the optical path, and controls exposure of the image sensor 3.

The image sensor 3 converts the image of the object that has been formed in a pixel array PA300 to an image signal. That is, the image sensor 3 performs image sensing of the object. The image sensor 3 reads out and outputs that image signal from the pixel array PA300. The image sensor 3, for example, is a CMOS image sensor or a CCD image sensor.

Specifically, as shown in FIG. 2, the image sensor 3 includes the pixel array PA300, a readout unit 31, and an amplifier 32. FIG. 2 shows the configuration of the image sensor 3 in the first embodiment of the present invention.

Figure 13:
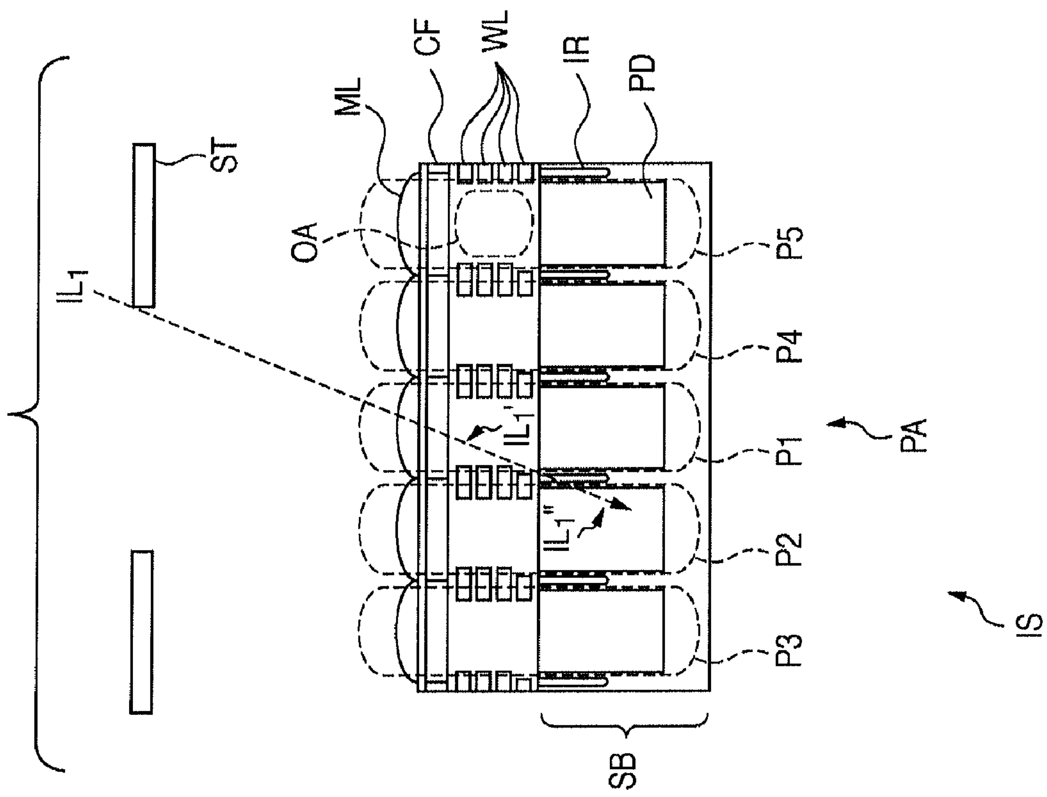
FIG. 13 Illustrates related art.
Figure 14B:
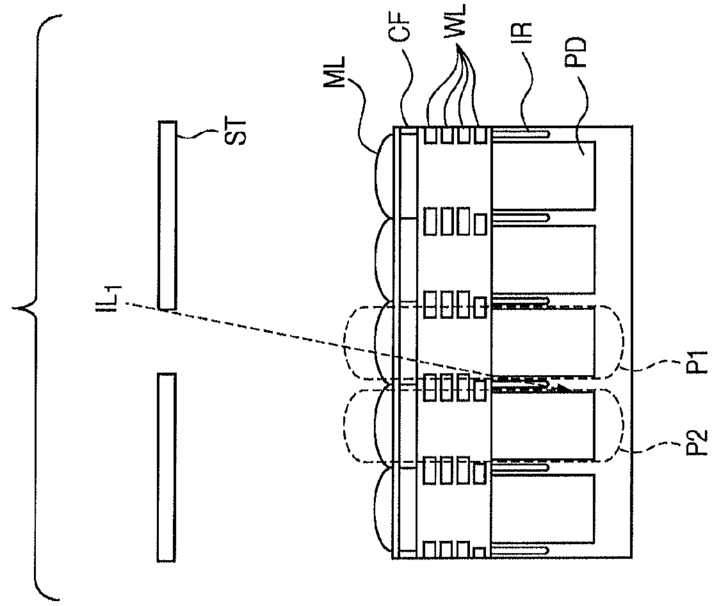
FIGS. 14A and 14B Illustrate related art.
Figure 14A:
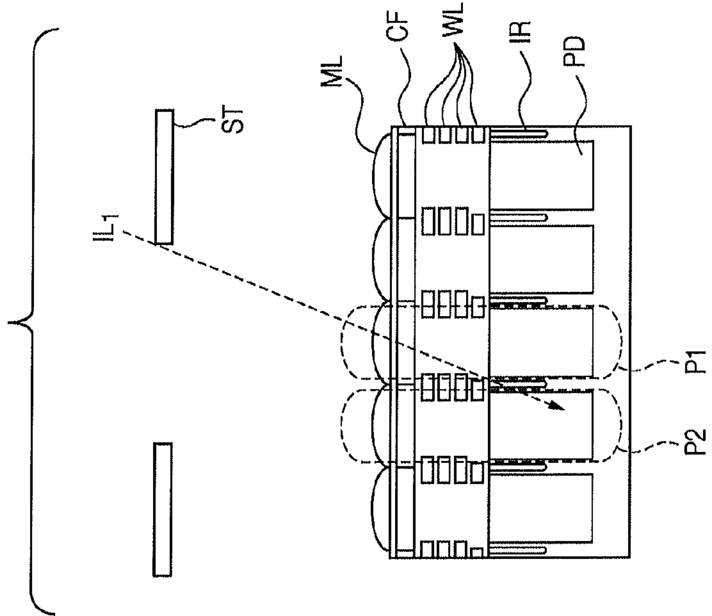
Figure 15A:
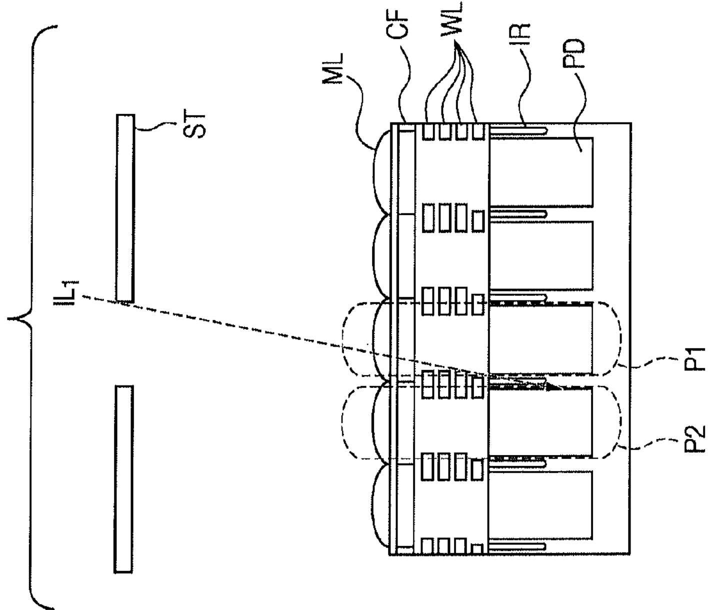
FIGS. 15A and 15B Illustrate related art.
Figure 15B:
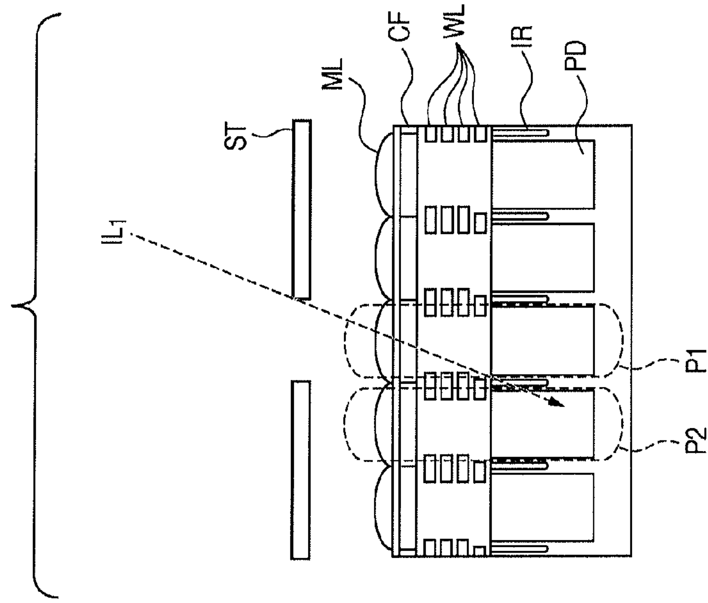
Figure 17:
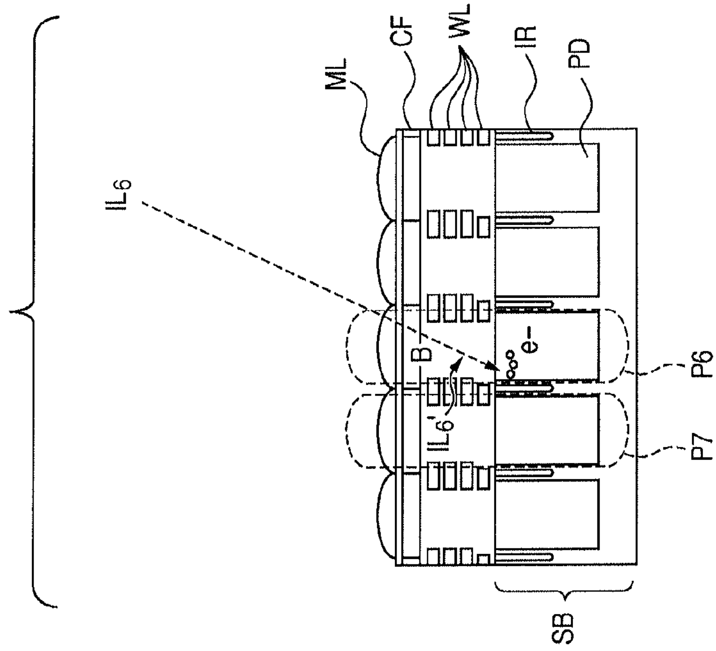
FIG. 17 Illustrates related art.
Figure 16:
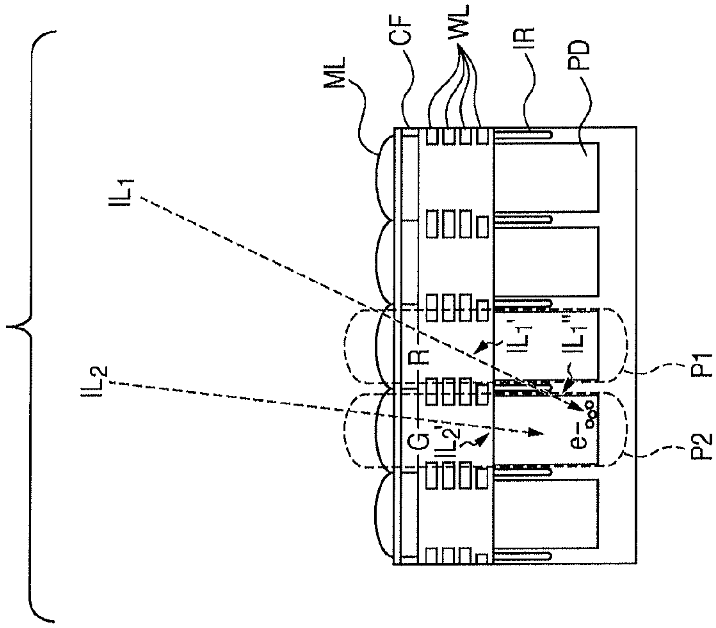
FIG. 16 Illustrates related art.
Figure 20:
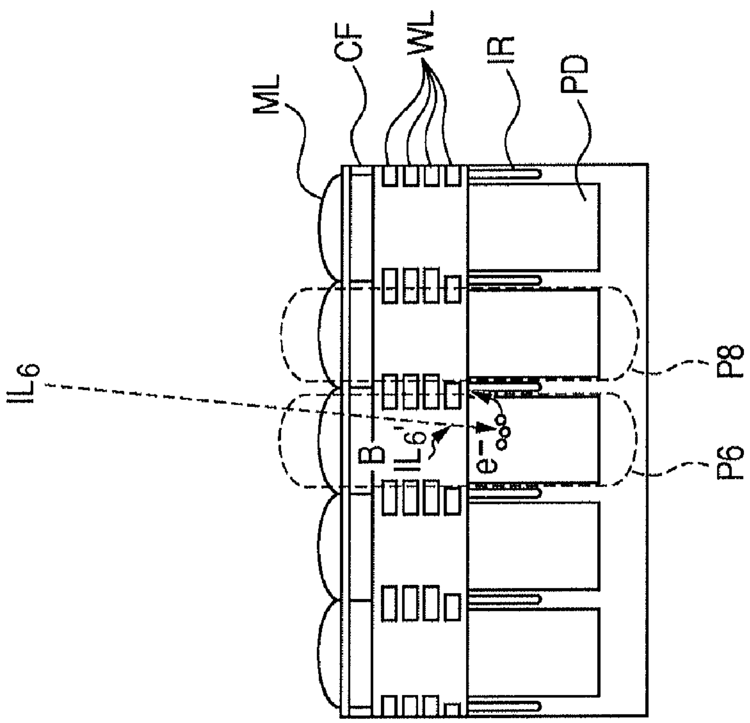
FIG. 20 Illustrates related art.

In the pixel array PA300, a plurality of pixels are arrayed in a direction along a row and a direction along a column. Each pixel includes a photoelectric conversion unit PD (see FIG. 13). The photoelectric conversion unit PD generates and stores charges (signal) according to light.

The readout unit 31 reads out a signal from the pixel array PA300. That is, the readout unit 31 reads out the charges (signal) stored by the photoelectric conversion unit PD of each pixel of the pixel array PA300, or a signal corresponding to the charges, from each pixel. The readout unit 31 supplies the signal that has been read out to the amplifier 32. The readout unit 31, for example, is a circuit that reads out a signal via a vertical signal line from each pixel in a CMOS image sensor, or is a vertical/horizontal transfer CCD in a CCD image sensor.

The amplifier 32 generates and outputs an image signal by amplifying the supplied signal. The amplifier 32, for example, is an output amplifier that amplifies a signal received via a horizontal signal line from the readout unit 31 in a CMOS image sensor, or is a floating diffusion amplifier in a CCD image sensor.

An A/D converter 4 receives an image signal (analog signal) that has been output from the image sensor 3. The A/D converter 4 converts the received image signal (analog signal) to an image signal (digital signal) and outputs the converted signal.

A timing signal generation circuit 5 generates a timing signal used as a reference and supplies that timing signal to a driving circuit 6.

The driving circuit 6, in synchronization with the supplied timing signal, respectively drives the optical system 1, the mechanical shutter 2, the image sensor 3, and the A/D converter 4.

A power switch (power SW) 16 receives an instruction to turn on power from a user. The power switch 16 supplies the received power switch on instruction to a system control unit 13.

A first switch (SW1) 17 receives a first instruction from the user. The first instruction is, for example, an instruction for causing performance of focus adjustment processing, exposure control processing, and white balance processing. The first switch 17 supplies the received first instruction to the system control unit 13.

A second switch (SW2) 18 receives a second instruction from the user. The second instruction is, for example, an instruction for causing execution of shooting processing. The second switch 18 supplies the received second instruction to the system control unit 13.

The system control unit 13 performs overall control of each part of the image sensing apparatus 100.

For example, the system control unit 13 starts up each part in response to a power on instruction received from the power switch 16.

For example, the system control unit 13 controls each part so as to perform focus adjustment processing, exposure control processing, and white balance processing in response to a first instruction received from the first switch 17.

For example, the system control unit 13 controls each part so as to perform shooting processing in response to a second instruction received from the second switch 18.

A volatile memory (RAM) 15 temporarily stores predetermined data. For example, the volatile memory 15 is used as a work area of the system control unit 13. That is, the system control unit 13 transfers programs stored in a non-volatile memory 14, control data, and correction data to the volatile memory 15 and temporarily stores them there, and appropriately refers to the stored items when performing control of each part.

The non-volatile memory (ROM) 14 stores a program describing a control method executed by the system control unit 13, and control data such as parameters and tables used when executing the program.

Also, the non-volatile memory 14 stores information used for color mixture correction processing, i.e., a first characteristic of color mixture information and a second characteristic of color mixture information.

The first characteristic of color mixture information is information that indicates characteristics related to a signal component that mixes in from an adjacent pixel to a pixel corresponding to a position in the pixel array PA300 (see FIG. 2). The first characteristic of color mixture information includes a first coefficient table. The first coefficient table is a table in which, for each pixel, a position in the pixel array PA300 is associated with a first correction coefficient that has been determined in advance so as to correct a signal component that mixes into a pixel from adjacent pixels.

The second characteristic of color mixture information is information that indicates characteristics related to a signal component that leaks out to an adjacent pixel from a pixel corresponding to a position in the pixel array PA300 (see FIG. 2). The second characteristic of color mixture information includes a second coefficient table. The second coefficient table is a table in which, for each pixel, a position in the pixel array PA300 is associated with a second correction coefficient that has been determined in advance so as to correct a signal component that leaks out from a pixel to adjacent pixels.

A signal processing circuit 7 receives an image signal (digital signal) that has been output from the A/D converter 4. The signal processing circuit 7 performs predetermined signal processing on the received image signal (digital signal).

For example, the signal processing circuit (correction unit) 7 performs color mixture correction processing that corrects a signal that has been read out from a pixel for correction in the pixel array PA300 by the readout unit 31 (see FIG. 2).

Specifically, the signal processing circuit 7 calculates the first correction coefficient for correcting a signal component that mixes into the pixel for correction from its adjacent pixel according to the position of the pixel for correction in the pixel array PA300 and the first coefficient table included in the first characteristic of color mixture information.

The signal processing circuit 7 calculates the second correction coefficient for correcting a signal component that leaks out from the pixel for correction to its adjacent pixel according to the position of the pixel for correction in the pixel array PA300 and the second coefficient table included in the second characteristic of color mixture information (first step).

The signal processing circuit 7 uses a signal read out from adjacent pixels of the pixel for correction by the readout unit 31 (see FIG. 2), the first correction coefficient, and the second correction coefficient to correct the signal that has been read out from the pixel for correction by the readout unit 31 (second step).

The signal processing circuit 7 generates image data by performing this signal processing. The signal processing circuit 7 supplies the generated image data to an image memory 8 or the system control unit 13. Alternatively, the signal processing circuit 7 converts the generated image data to compressed image data for recording, and supplies the converted compressed image data to a recording circuit 10. Alternatively, the signal processing circuit 7 converts the generated image data to an image signal for display, and supplies the converted image signal for display to a display circuit 12.

The image memory 8 temporarily stores the image data that has been supplied from the signal processing circuit 7.

A recording medium 9 is detachably connected to the recording circuit 10. The recording circuit 10 records the compressed image data for recording that has been supplied from the signal processing circuit 7 to the connected recording medium 9.

The display circuit 12 displays an image corresponding to the image signal for display supplied from the signal processing circuit 7 in an image display device 11.

In this way, the signal processing circuit 7 calculates each of the first correction coefficient and the second correction coefficient according to the position of the pixel for correction in the pixel array PA300 (see FIG. 2), so it is possible to appropriately set each of the first correction coefficient and the second correction coefficient according to the position of the pixel for correction.

Also, the signal processing circuit 7 uses a signal read out from adjacent pixels of the pixel for correction, the first correction coefficient, and the second correction coefficient to correct the signal that has been read out from the pixel for correction. Thus, it is possible to perform appropriate correction according to the position of the pixel for correction in the pixel array PA300 (see FIG. 2).

Accordingly, it is possible to reduce the effect of a difference in color mixture due to a difference in the position of each pixel in the pixel array PA300 on the color reproducibility of an image corresponding to the image signal, so it is possible to improve the accuracy of color mixture correction processing for each pixel in the pixel array.

Next is a description of operation in shooting processing using the mechanical shutter 2 in the image sensing apparatus 100. The shooting processing, as described later, includes exposure processing, development processing, and recording processing.

Prior to operations (processings) in the shooting processing, when starting operation of the system control unit 13, such as when powering on the image sensing apparatus 100, necessary programs, control data, and correction data are transferred from the non-volatile memory 14 to the volatile memory 15, and stored there.

Then, the shooting processing starts. With the start of shooting processing, the system control unit 13 uses the various programs and data by, as necessary, transferring the various programs and data from the non-volatile memory 14 to the volatile memory 15, or directly reading out the various programs and data from the non-volatile memory 14.

The system control unit 13 controls exposure processing in the shooting processing. With a control signal from the system control unit 13, the optical system 1 is driven for the stop 1*b* and the lens 1*a* to form an image of an object that has been set to an appropriate brightness on the image sensor 3.

With a control signal from the system control unit 13, the mechanical shutter 2 is driven so as to expose the image sensor 3 during a necessary exposure time in accordance with operation of the image sensor 3. Here, when the image sensor 3 has an electronic shutter function, this function may be used together with the mechanical shutter 2 to secure the necessary exposure time.

The image sensor 3 is driven by a driving pulse generated by the driving circuit 6 based on an operation pulse generated by the timing signal generation circuit 5 controlled by the system control unit 13, and photoelectrically converts the object image to an electrical signal, and outputs that signal as an analog image signal.

The analog image signal output from the image sensor 3 is converted to a digital image signal by the A/D converter 4, by the driving pulse generated by the driving circuit 6 based on the operation pulse generated by the timing signal generation circuit 5 controlled by the system control unit 13.

The system control unit 13 controls development processing in the shooting processing. Thus, the signal processing circuit 7 generates image data by performing image processing such as various correction including color mixture correction, color conversion, white balance, and gamma correction, resolution conversion processing, image compression processing, and so forth with respect to the digital image signal.

The image memory 8 is used in order to temporarily store a digital image signal during signal processing, and to store image data that is the signal-processed digital image signal.

The system control unit 13 controls recording processing in the shooting processing. Thus, the image data that has been signal-processed by the signal processing circuit 7 and the image data that has been stored in the image memory 8, in the recording circuit 10, is converted to compressed image data appropriate to the recording medium 9 (for example, compressed data of a file system having a hierarchical structure), and recorded to the recording medium 9.

Also, after resolution conversion processing by the signal processing circuit 7 is performed on the image data that has been converted to a digital image signal by the A/D converter 4, that processed image data is converted to a signal appropriate to the image display device 11 (for example, such as an NTSC-format analog signal) in the display circuit 12. Then, that converted signal is displayed in the image display device 11.

Here, in the signal processing circuit 7, without performing signal processing by a control signal from the system control unit 13, the digital image signal may be used as-is as image data, and output to the image memory 8 or the recording circuit 10.

Also, when there has been a request from the system control unit 13, the signal processing circuit 7 outputs information of the digital image signal or image data produced in the course of signal processing, or information extracted from such digital image signal or image data, to the system control unit 13. Information of the digital image signal or image data may be, for example, information such as an image spatial frequency, the mean value of a designated region, the amount of compressed image data, and so forth.

When there has been a request from the system control unit 13, the recording circuit 10 outputs information such as the type and available space of the recording medium 9 to the system control unit 13.

Next is a description of playback operation in the image sensing apparatus 100 when image data has been recorded to the recording medium 9.

The system control unit 13 receives an instruction to play back the image data recorded to the recording medium 9 from the first switch 17 and/or the second switch 18, or from another switch (not shown). The system control unit 13 controls the recording circuit 10 according to the received playback instruction.

By a control signal from the system control unit 13, the recording circuit 10 reads out image data from the recording medium 9.

By a control signal from the system control unit 13, the signal processing circuit 7, when the image data is a compressed image, performs image decompression processing, and then stores the image data in the image memory 8. After resolution conversion processing by the signal processing circuit 7 is performed on the image data stored in the image memory 8, that processed image data is converted to a signal appropriate to the image display device 11 in the display circuit 12, and displayed in the image display device 11.

Figure 3:
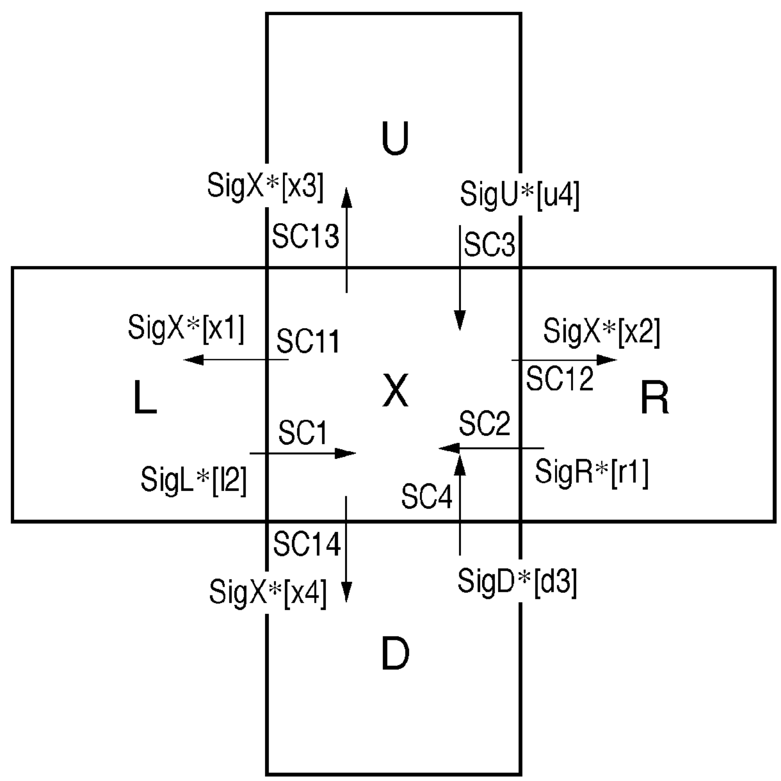
FIG. 3 schematically shows color mixture that occurs between a pixel for correction and pixels adjacent to that pixel.

Next is a description of color mixture that occurs between a pixel for correction and pixels adjacent to that pixel, with reference to FIG. 3. FIG. 3 schematically shows color mixture that occurs between a pixel for correction and pixels adjacent to that pixel.

A case is considered where attention is focused on one specific pixel (referred to as pixel X). In comparison to an ideal signal SigX', the level of a signal SigX that is read out from the pixel X is reduced by signal components SC11 to SC14 that leak out to adjacent pixels, and the level of that signal SigX is increased by signal components SC1 to SC4 that mix in from adjacent pixels.

Here, the signal component SC11 is a signal component that has leaked out from the pixel X to a pixel L that is adjacent in a first direction (for example, left) relative to the pixel X. The signal component SC12 is a signal component that has leaked out from the pixel X to a pixel R that is adjacent in a second direction (for example, right) relative to the pixel X. The signal component SC13 is a signal component that has leaked out from the pixel X to a pixel U that is adjacent in a third direction (for example, up) relative to the pixel X. The signal component SC14 is a signal component that has leaked out from the pixel X to a pixel D that is adjacent in a fourth direction (for example, down) relative to the pixel X.

The signal component SC1 is a signal component that has mixed into the pixel X from the pixel L that is adjacent in the first direction (for example, left) relative to the pixel X. The signal component SC2 is a signal component that has mixed into the pixel X from the pixel R that is adjacent in the second direction (for example, right) relative to the pixel X. The signal component SC3 is a signal component that has mixed into the pixel X from the pixel U that is adjacent in the third direction (for example, up) relative to the pixel X. The signal component SC4 is a signal component that has mixed into the pixel X from the pixel D that is adjacent in the fourth direction (for example, down) relative to the pixel X.

The amount of the signal that has leaked out in a predetermined direction from the pixel X has a fixed ratio relative to the ideal signal SigX', but here, for the sake of simplification, the amount of that signal is considered to have a fixed ratio relative to the signal SigX. The signal amount of the components that have leaked out to adjacent pixels from the pixel X can be calculated by multiplying SigX by a coefficient that expresses the ratio of the signal that leaks out to the adjacent pixel in each direction from the pixel X relative to the signal SigX that has been read out from the pixel X.

Likewise, the signal amount of the components that have mixed into the pixel X from the adjacent pixels can be calculated by multiplying the signal that has been read out from each adjacent pixel by a coefficient that expresses the ratio of the signal that mixes into the pixel X from each adjacent pixel relative to the signal that has been read out from each adjacent pixel.

Here, a signal that has been read out from the pixel X is called SigX, and a signal that has been read out from the pixel L that is adjacent in the first direction (for example, left) relative to the pixel X is called SigL. A signal that has been read out from the pixel R that is adjacent in the second direction (for example, right) relative to the pixel X is called SigR, and a signal that has been read out from the pixel U that is adjacent in the third direction (for example, up) relative to the pixel X is called SigU. A signal that has been read out from the pixel D that is adjacent in the fourth direction (for example, down) relative to the pixel X is called SigD.

Also, a coefficient for correcting the signal component that leaks out from the pixel X to the pixel L is called [x1], and a coefficient for correcting the signal component that mixes into the pixel X from the pixel L is called [l2]. A coefficient for correcting the signal component that leaks out from the pixel X to the pixel R is called [x2], and a coefficient for correcting the signal component that mixes into the pixel X from the pixel R is called [r1]. A coefficient for correcting the signal component that leaks out from the pixel X to the pixel U is called [x3], and a coefficient for correcting the signal component that mixes into the pixel X from the pixel U is called [u4]. A coefficient for correcting the signal component that leaks out from the pixel X to the pixel D is called [x4], and a coefficient for correcting the signal component that mixes into the pixel X from the pixel D is called [d3].

Here, the ideal signal SigX', in which the color mixture component included in the signal SigX of the pixel X has been corrected, is calculated by the following Formula 1.

$$\mathrm{Sig}X' = \mathrm{Sig}X + \mathrm{Sig}X^*([x1] + [x2] + [x3] + [x4]) - \mathrm{Sig}L^*[l2] - \mathrm{Sig}R^*[r1]\mathrm{Sig}U^*[u4] - \mathrm{Sig}D^*[d3] \qquad \text{Formula 1}$$

As indicated in Formula 1, in order to correct pixel color mixture, the first characteristic of color mixture information may be set by associating the four color mixture correction coefficients [l2], [r1], [u4], and [d3] with the position (coordinates) of each pixel. Also, the second characteristic of color mixture information may be set by associating the four color mixture correction coefficients [x1], [x2], [x3], and [x4] with the position (coordinates) of each pixel.

Alternatively, from Formula 1, it is possible to gather the coefficients for correcting the signal components that leak out from the pixel X. Therefore, $$[x]=[x1]+[x2]+[x3]+[x4] \quad \text{Formula 2}$$

may be adopted, and the second characteristic of color mixture information set by associating the one color mixture correction coefficient [x] with the position of each pixel.

Alternatively, SigX*[x1] is the signal component that leaks out to the pixel L that is adjacent in the first direction when viewed from the pixel X, and is also the signal component that mixes in from the pixel X when viewed from the pixel L. Both signal components are theoretically equivalent. Therefore, the second characteristic of color mixture information may be set by associating the four color mixture correction coefficients [x1], [x2], [x3], and [x4] with the position of each pixel, and the first characteristic of color mixture information may be derived from the second characteristic of color mixture information. The signal processing circuit 7, when performing color mixture correction processing, for the position of each pixel, associates the four color mixture correction coefficients [l2], [r1], [u4], and [d3] with the four color mixture correction coefficients [x1], [x2], [x3], and [x4] of the four adjacent pixels, related to each of those four pixels, and uses these color mixture correction coefficients [l2], [r1], [u4], and [d3] for the first characteristic of color mixture information. That is, a coefficient table in which the four color mixture correction coefficients [x1], [x2], [x3], and [x4] are associated with the position of each pixel may be used as the second coefficient table, and the first coefficient table may be derived from the second coefficient table.

Alternatively, conversely, the first characteristic of color mixture information may be set by associating the four color mixture correction coefficients [l2], [r1], [u4], and [d3] with the position of each pixel, and the second characteristic of color mixture information may be derived from the first characteristic of color mixture information. The signal processing circuit 7, when performing color mixture correction processing, for the position of each pixel, associates the four color mixture correction coefficients [x1], [x2], [x3], and [x4] with the four color mixture correction coefficients [l2], [r1], [u4], and [d3] of the four adjacent pixels, related to each of those four pixels, and uses these color mixture correction coefficients [x1], [x2], [x3], and [x4] for the second characteristic of color mixture information. That is, a coefficient table in which the four color mixture correction coefficients [l2], [r1], [u4], and [d3] are associated with the position of each pixel may be used as the first coefficient table, and the second coefficient table may be derived from the first coefficient table.

This color mixture correction coefficient can be calculated by measuring, in advance, the signal output of the pixel of interest and pixels adjacent to that pixel, using a light source with a very constricted (small) irradiation angle to irradiate light on a single pixel of interest of the image sensor. Here, the ratio of signal leak out from the pixel X or pixels adjacent to that pixel changes depending on the incidence angle component of the light ray on each pixel, so when measuring, it is necessary to measure at a plurality of irradiation angles while changing the angle of irradiated light relative to the single pixel of interest.

In addition to the relationship of the incidence angle of light relative to the pixel X and the respective signal amounts of the pixel X and the pixels adjacent to that pixel, the color mixture correction coefficient is calculated also based on the angle of a light ray incident on the image sensor from the optical system of the image sensing apparatus and the positional relationship of each pixel on the image sensor with the optical center of the image sensing apparatus. That is, it is possible to create a coefficient table in which the position of each pixel in the pixel array is associated with the 8 color mixture correction coefficients [x1], [x2], [x3], [x4], [l2], [r1], [u4], and [d3].

Alternatively, the color mixture correction coefficient may be determined based on a theoretical value that has been calculated by a simulation. A theoretical color mixture correction coefficient may be calculated by a simulation, from the positional relationship of each pixel on the image sensor with the optical center of the image sensing apparatus, the incidence angle of a light ray on each pixel, pixel cell size, pixel pitch, color filter height, the internal structure of the image sensor, and so forth.

Figure 4:
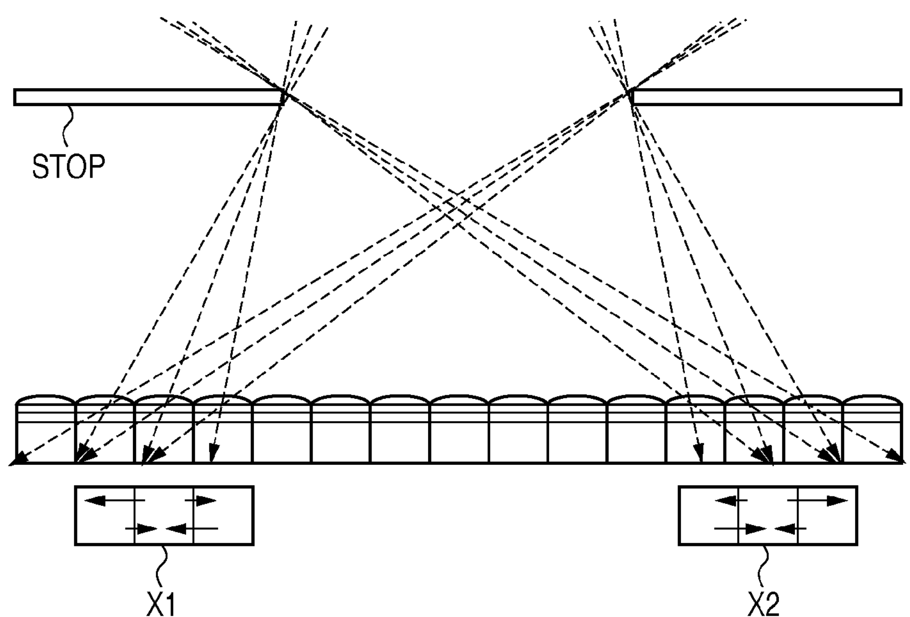
FIG. 4 shows light respectively incident on pixels X1 and X2 and adjacent pixels in a direction along that row.

Next is a description of the relationship of the position of pixels in the pixel array and the color mixture correction coefficient, with reference to FIGS. 2 and 4. FIG. 2 shows the position of each pixel in the pixel array, including pixels Xc and X1 to X4 and pixels adjacent thereto. FIG. 4 shows light respectively incident on pixels X1 and X2 and adjacent pixels in a direction along that row.

As shown in FIGS. 2 and 4, in the pixel X1 disposed on the left side relative to the optical center PC in the pixel array PA300, in comparison to a pixel Xc positioned at the optical center PC, the coefficients [x1] and [r1] are large, and conversely the coefficients [x2] and [l2] are small. On the other hand, in the pixel X1, the coefficients [x3], [x4], [u4], and [d3] are the same as in the pixel Xc positioned at the optical center PC.

As shown in FIGS. 2 and 4, in the pixel X2 disposed on the right side relative to the optical center PC in the pixel array PA300, in comparison to the pixel Xc positioned at the optical center PC, the coefficients [x2] and [l2] are large, and conversely the coefficients [x1] and [r1] are small. On the other hand, in the pixel X2, the coefficients [x3], [x4], [u4], and [d3] are the same as in the pixel Xc positioned at the optical center PC.

As shown in FIG. 2, in the pixel X3 disposed above the optical center PC in the pixel array PA300, in comparison to the pixel Xc positioned at the optical center PC, the coefficients [x3] and [d3] are large, and conversely the coefficients [x4] and [u4] are small. On the other hand, in the pixel X3, the coefficients [x1], [x2], [l2], and [r1] are the same as in the pixel Xc positioned at the optical center PC.

As shown in FIG. 2, in the pixel X4 disposed below relative to the optical center PC in the pixel array PA300, in comparison to the pixel Xc positioned at the optical center PC, the coefficients [x4] and [u4] are large, and conversely the coefficients [x3] and [d3] are small. On the other hand, in the pixel X4, the coefficients [x1], [x2], [l2], and [r1] are the same as in the pixel Xc positioned at the optical center PC.

In this way, the color mixture correction coefficient depends on the positional relationship of each pixel in the pixel array PA300 with the optical center PC, and has a different value for each pixel. Therefore, in order to increase the accuracy of color mixture correction of the image signal throughout the entire screen, it is possible to adopt a coefficient table in which, for all pixels, the 8 coefficients [x1], [x2], [x3], [x4], [l2], [r1], [u4], and [d3] are associated with the position of each pixel. Alternatively, a coefficient table may be adopted in which the 5 coefficients [x], [l2], [r1], [u4], and [d3] are associated with the position of each pixel. Alternatively, a coefficient table may be adopted in which the 4 coefficients [x1], [x2], [x3], and [x4] are associated with the position of each pixel. Alternatively, a coefficient table may be adopted in which the 4 coefficients [l2], [r1], [u4], and [d3] are associated with the position of each pixel.

In the present embodiment, an image sensor employing a Bayer array is described, but when carrying out the present invention, the color filter array in pixels is not limited to being a Bayer array. Also, in the present embodiment, each pixel is made to have respective correction coefficients for color mixture that occurs between each pixel and pixels that are adjacent in the up, down, left, and right directions, but each pixel may be made to have a correction coefficient for pixels that are adjacent in a diagonal direction. Furthermore, each pixel may be made to have a correction coefficient not only for correcting color mixture that occurs between each pixel and adjacent pixels, but also for correcting color mixture that occurs between each pixel and pixels that are separated by a predetermined number of pixels from a pixel of interest.

Next is a description of an image sensing apparatus 100*i* according to a second embodiment of the present invention. Below, mainly portions that differ from the first embodiment will be described.

As shown in FIG. 5, a non-volatile memory 14*i* of the image sensing apparatus 100*i* stores, as the first characteristic of color mixture information, instead of the first coefficient table, a first row correction data RD1 and a first column correction data CD1. The first row correction data RD1 is data in which a position in the direction along a row (horizontal direction) in the pixel array PA300 is associated with a coefficient that has been determined in advance so as to correct a signal component that mixes into a pixel in a row that includes the optical center PC of the pixel array PA300 from an adjacent pixel (a pixel adjacent in the direction along a column to the pixel for correction). The first column correction data CD1 is data in which a position in the direction along a column (vertical direction) in the pixel array PA300 is associated with a coefficient that has been determined in advance so as to correct a signal component that mixes into a pixel in a column that includes the optical center PC of the pixel array PA300 from an adjacent pixel (a pixel adjacent in the direction along a row to the pixel for correction). FIG. 5 shows the first characteristic of color mixture information and the second characteristic of color mixture information in the second embodiment of the present invention.

Also, as shown in FIG. 5, the non-volatile memory 14*i* stores, as the second characteristic of color mixture information, instead of the second coefficient table, a second row correction data RD2 and a second column correction data CD2. The second row correction data RD2 is data in which a position in the direction along a row (horizontal direction) in the pixel array PA300 is associated with a coefficient that has been determined in advance so as to correct a signal component that leaks out from a pixel in a row that includes the optical center PC of the pixel array PA300 to an adjacent pixel (a pixel adjacent in the direction along a column to the pixel for correction). The second column correction data CD2 is data in which a position in the direction along a column (vertical direction) in the pixel array PA300 is associated with a coefficient that has been determined in advance so as to correct a signal component that leaks out from a pixel in a column that includes the optical center PC of the pixel array PA300 to an adjacent pixels (a pixel adjacent in the direction along a row to the pixel for correction).

A signal processing circuit 7*i* of the image sensing apparatus 100*i* calculates the first correction coefficients [r1] and [l2] for the direction along a row, according to the position in the direction along a row of the pixel for correction in the pixel array PA300 and the first row correction data RD1. The signal processing circuit 7*i* calculates the first correction coefficients [u4] and [d3] for the direction along a column, according to the position in the direction along a column of the pixel for correction in the pixel array PA300 and the first column correction data CD1.

Also, the signal processing circuit 7*i* of the image sensing apparatus 100*i* calculates the second correction coefficients [x1] and [x2] for the direction along a row, according to the position in the direction along a row of the pixel for correction in the pixel array PA300 and the second row correction data RD2. The signal processing circuit 7*i* calculates the second correction coefficients [x4] and [x3] for the direction along a column, according to the position in the direction along a column of the pixel for correction in the pixel array PA300 and the second column correction data CD2.

In this way, the non-volatile memory 14*i* stores, as the first characteristic of color mixture information, instead of the first coefficient table which is two-dimensional data, the first row correction data RD1 and the first column correction data CD1, which are each one-dimensional data. Also, the non-volatile memory 14*i* stores, as the second characteristic of color mixture information, instead of the second coefficient table which is two-dimensional data, the second row correction data RD2 and the second column correction data CD2, which are each one-dimensional data. Thus, it is possible to reduce the data amount of the first characteristic of color mixture information and the data amount of the second characteristic of color mixture information.

For example, when determining the color mixture correction coefficient, the aperture diameter of the stop of the lens in the optical system of the image sensing apparatus is a factor affecting the angle of a light ray incident on the image sensor from the optical system of the image sensing apparatus. Therefore, in order to improve the accuracy of color mixture correction of the image signal even when the optical system changes, it is necessary to change the color mixture correction coefficient for each F value of the stop of the lens. Here, the image sensing apparatus stores, for each lens stop F value, for all pixels of the image sensor, characteristic of color mixture information that includes a plurality of color mixture correction coefficients that differ by pixel, and thus the data amount of the characteristic of color mixture information greatly increases.

On the contrary, in the present embodiment, attention is focused on the fact that the amount of color mixture is determined by the distance from the optical center in the pixel array. Based on the color mixture correction coefficients for all pixels, the respective color mixture correction coefficients [x1], [x2], [l2], and [r1] of each pixel in a pixel row to which a pixel disposed in the optical center in the pixel array belongs are converted to one-dimensional data in the horizontal direction that corresponds to [x1], [x2], [l2], and [r1]. Also, the respective color mixture correction coefficients [x3], [x4], [u4], and [d3] of each pixel in a pixel column to which a pixel disposed in the optical center in the pixel array belongs are converted to one-dimensional data in the vertical direction that corresponds to [x3], [x4], [u4], and [d3]. A configuration may be adopted in which the non-volatile memory 14*i* stores color mixture correction data (one-dimensional data) instead of the color mixture correction coefficients, and the signal processing circuit 7*i* performs correction by deriving color mixture correction coefficients corresponding to each pixel based on that data.

Figures 6, 7, 8:
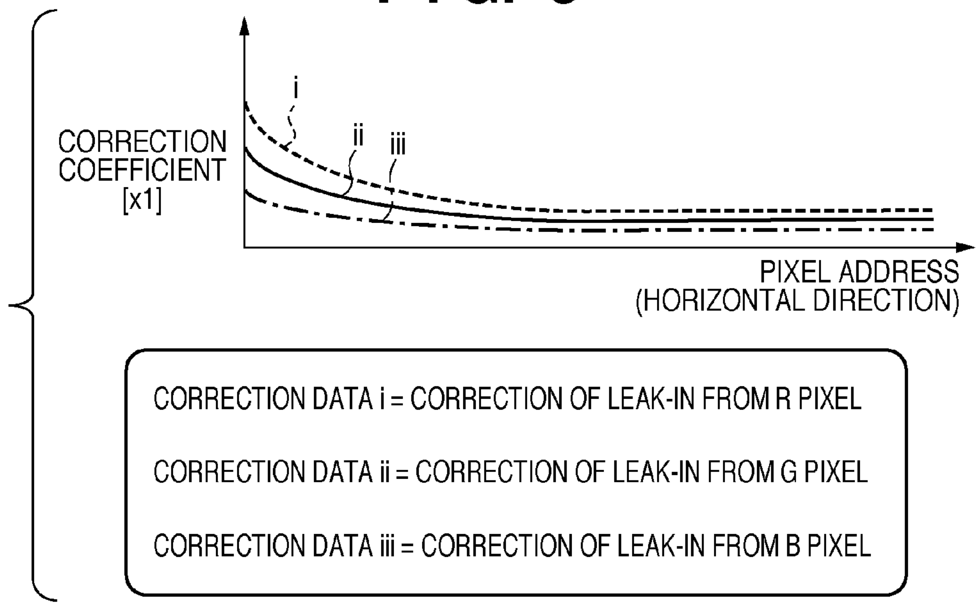
FIG. 6 shows a table of one-dimensional data and stop F values in the second embodiment of the present invention.
FIG. 7 shows a table of one-dimensional data and pupil distances in the second embodiment of the present invention.
FIG. 8 shows correction data for each color in the second embodiment of the present invention.

As shown in FIG. 6, the non-volatile memory 14*i* stores a table of one-dimensional data and stop F values. From this table, the signal processing circuit 7*i* selects color mixture correction data (one-dimensional data) that corresponds to the F value that matches the shooting condition, obtains color mixture correction coefficients that correspond to the pixel for correction, and thus can perform signal correction. FIG. 6 shows a table of one-dimensional data and stop F values in the second embodiment of the present invention.

Alternatively, for example, when determining the color mixture correction coefficient, the exit pupil distance of the lens is a factor affecting the angle of a light ray incident on the image sensor from the optical system of the image sensing apparatus. Therefore, in order to favorably correct color mixture of the image signal even when the optical system changes, it is necessary to change the color mixture correction coefficient for each exit pupil distance of the lens. Here, the image sensing apparatus has, for each exit pupil distance of the lens, for all pixels of the image sensor, a plurality of color mixture correction coefficients that differ by pixel, and thus the data amount of the characteristic of color mixture information greatly increases.

On the contrary, in the present embodiment, as shown in FIG. 7, the non-volatile memory 14*i* stores a table of one-dimensional data and exit pupil distances. From this table, the signal processing circuit 7*i* selects color mixture correction data (one-dimensional data) that corresponds to the exit pupil distance that matches the shooting condition, obtains color mixture correction coefficients that correspond to the pixel for correction, and thus can perform signal correction. FIG. 7 shows a table of one-dimensional data and exit pupil distances in the second embodiment of the present invention.

Alternatively, for example, when determining the color mixture correction coefficient, when the optical system further includes a zoom lens in addition to the lens 1*a* (see FIG. 1), the zoom position of the zoom lens is a factor affecting the angle of a light ray incident on the image sensor from the optical system of the image sensing apparatus. The stop and exit pupil distance of the lens 1*a* (see FIG. 1) change due to changing the zoom position of the zoom lens. Therefore, in order to improve the accuracy of color mixture correction of the image signal even when the operating state of the optical system changes, it is necessary to change the color mixture correction coefficient for each zoom position of the lens. Here, the image sensing apparatus has, for each zoom position of the lens, for all pixels of the image sensor, a plurality of color mixture correction coefficients that differ by pixel, and thus the data amount of the characteristic of color mixture information greatly increases.

On the contrary, in the present embodiment, the signal processing circuit 7*i* calculates the stop F value and exit pupil distance that match the zoom position of the lens. The signal processing circuit 7*i* selects color mixture correction data (one-dimensional data) that corresponds to the calculated F value from the table shown in FIG. 6, and selects color mixture correction data (one-dimensional data) that corresponds to the calculated exit pupil distance from the table shown in FIG. 7. The signal processing circuit 7*i* adds the correction coefficient for that stop and the correction coefficient for that exit pupil distance, and then can perform correction of the signal of the pixel for correction.

The non-volatile memory 14*i* may store a table (not shown) of one-dimensional data and zoom positions. In this case, from this table, the signal processing circuit 7*i* selects color mixture correction data (one-dimensional data) that corresponds to the zoom position that matches the shooting condition, obtains color mixture correction coefficients that correspond to the pixel for correction, and thus can perform signal correction.

Alternatively, for example, when determining the color mixture correction coefficient, when the present invention is applied to a lens-swappable image sensing apparatus or the like, the type of lens that can be mounted is a factor affecting the angle of a light ray incident on the image sensor from the optical system of the image sensing apparatus. The stop and exit pupil distance of the lens 1*a* (see FIG. 1) change due to changing the type of lens that is mounted. Therefore, in order to improve the accuracy of color mixture correction of the image signal even when the optical system changes, it is necessary to change the color mixture correction coefficient for each type of lens that is mounted. Here, the image sensing apparatus has, for each type of lens that is mounted, for all pixels of the image sensor, a plurality of color mixture correction coefficients that differ by pixel, and thus the data amount of the characteristic of color mixture information greatly increases.

On the contrary, in the present embodiment, the signal processing circuit 7*i* calculates the stop F value and exit pupil distance that match the type of lens that is actually mounted. The signal processing circuit 7*i* selects color mixture correction data (one-dimensional data) that corresponds to the calculated F value from the table shown in FIG. 6, and selects color mixture correction data (one-dimensional data) that corresponds to the calculated exit pupil distance from the table shown in FIG. 7. The signal processing circuit 7*i* adds the correction coefficient for that stop and the correction coefficient for that exit pupil distance, and then can perform correction of the signal of the pixel for correction.

The non-volatile memory 14*i* may store a table (not shown) of one-dimensional data and lens types. In this case, from this table, the signal processing circuit 7*i* selects color mixture correction data (one-dimensional data) that corresponds to the type of lens that is actually mounted, obtains color mixture correction coefficients that correspond to the pixel for correction, and thus can perform signal correction.

Alternatively, for example, when determining the color mixture correction coefficient, the color of light that is incident on the photoelectric conversion unit is a factor affecting the angle of a light ray incident on the image sensor from the optical system of the image sensing apparatus. Therefore, in order to improve the accuracy of color mixture correction of the image signal even when the optical system changes, it is necessary to change the color mixture correction coefficient for each color of light that is incident on the photoelectric conversion unit. Here, the image sensing apparatus has, for each color of light that is incident on the photoelectric conversion unit, for all pixels of the image sensor, a plurality of color mixture correction coefficients that differ by pixel, and thus the data amount of the characteristic of color mixture information greatly increases.

On the contrary, in the present embodiment, the non-volatile memory 14*i* stores a table of one-dimensional data and light colors. From this table, the signal processing circuit 7*i* selects correction data (row correction data or column correction data that is one-dimensional data) as shown in FIG. 8 that corresponds to the color of the color filter of the pixel for correction. For example, the signal processing circuit 7*i* selects correction data 'i' shown in FIG. 8 when the pixel for correction is an R pixel (when the color of the color filter is red). For example, the signal processing circuit 7*i* selects correction data shown in FIG. 8 when the pixel for correction is a G pixel (when the color of the color filter is green). For example, the signal processing circuit 7*i* selects correction data 'iii' shown in FIG. 8 when the pixel for correction is a B pixel (when the color of the color filter is blue). Thus, the signal processing circuit 7*i* obtains the color mixture correction coefficients that correspond to the pixel for correction, and can perform signal correction. FIG. 8 shows a correction data of each color in the second embodiment of the present invention.

Next is a description of an image sensing apparatus according to a third embodiment of the present invention. Below, portions that differ from the first embodiment will be mainly described.

The non-volatile memory of the image sensing apparatus according to the present embodiment, although not shown, as first characteristic of color mixture information, stores a first relational expression instead of a first coefficient table. The first relational expression is a formula that expresses the relationship between the position in the pixel array and the first correction coefficient that has been predetermined so as to correct a signal component that mixes into a pixel from an adjacent pixel.

Also, the non-volatile memory, although not shown, as second characteristic of color mixture information, stores a second relational expression instead of a second coefficient table. The second relational expression is a formula that expresses the relationship between the position in the pixel array and the second correction coefficient that has been predetermined so as to correct a signal component that leaks out from a pixel to an adjacent pixel.

The signal processing circuit of the image sensing apparatus calculates first correction coefficients [r1], [l2], [u4], and [d3] according to the position of the pixel for correction in the pixel array and the first relational expression.

Also, the signal processing circuit of the image sensing apparatus calculates second correction coefficients [x1], [x2], [x3], and [x4] according to the position of the pixel for correction in the pixel array and the second relational expression.

In this way, the non-volatile memory stores, as the first characteristic of color mixture information, instead of the first coefficient table which is 2-dimensional data, the first relational expression which is 0-dimensional data. Also, the non-volatile memory stores, as the second characteristic of color mixture information, instead of the second coefficient table which is 2-dimensional data, the second relational expression which is 0-dimensional data. Thus, it is possible to further reduce the amount of data of the first characteristic of color mixture information and the amount of data of the second characteristic of color mixture information.

The non-volatile memory of the image sensing apparatus may store, as the first characteristic of color mixture information, instead of the first relational expression, a first row relational expression and a first column relational expression. The first row relational expression is a formula that expresses the relationship of a position in the direction along a row (horizontal direction) in the pixel array with a coefficient that has been determined in advance so as to correct a signal component that mixes into a pixel in a row that includes the optical center of the pixel array from adjacent pixels (pixels adjacent in the direction along a column). The first column relational expression is a formula that expresses the relationship of a position in the direction along a column (vertical direction) in the pixel array with a coefficient that has been determined in advance so as to correct a signal component that mixes into a pixel in a column that includes the optical center of the pixel array from adjacent pixels (pixels adjacent in the direction along a row).

Also, the non-volatile memory stores, as the second characteristic of color mixture information, instead of the second relational expression, a second row relational expression and a second column relational expression. The second row relational expression is a formula that expresses the relationship of a position in the direction along a row (horizontal direction) in the pixel array with a coefficient that has been determined in advance so as to correct a signal component that leaks out from a pixel in a row that includes the optical center of the pixel array to an adjacent pixel (a pixel adjacent in the direction along a column to the pixel for correction). The second column relational expression is a formula that expresses the relationship of a position in the direction along a column (vertical direction) in the pixel array with a coefficient that has been determined in advance so as to correct a signal component that leaks out from a pixel in a column that includes the optical center of the pixel array to an adjacent pixel (a pixel adjacent in the direction along a row to the pixel for correction).

The signal processing circuit of the image sensing apparatus calculates the first correction coefficients [r1] and [l2] for the direction along a row, according to the position in the direction along a row of the pixel for correction in the pixel array and the first row relational expression. The signal processing circuit calculates the first correction coefficients [u4] and [d3] for the direction along a column, according to the position in the direction along a column of the pixel for correction in the pixel array and the first column relational expression.

Also, the signal processing circuit of the image sensing apparatus calculates the second correction coefficients [x1] and [x2] for the direction along a row, according to the position in the direction along a row of the pixel for correction in the pixel array and the second row relational expression. The signal processing circuit calculates the second correction coefficients [x3] and [x4] for the direction along a column, according to the position in the direction along a column of the pixel for correction in the pixel array and the second column relational expression.

Next is a description of an image sensing apparatus 100*j* according to a fourth embodiment of the present invention. Below, portions that differ from the first embodiment will be mainly described.

The image sensing apparatus 100*j* is provided with an image sensor 3*j* and a signal processing circuit 7*j*.

As shown in FIG. 9, the image sensor 3*j* includes a readout unit 31*j*. The readout unit 31*j*, in a first mode (whole-screen mode), reads out a signal from all of the pixels in the pixel array PA300, and in a second mode (sub-sampling mode), reads out a signal from a portion of the pixels in the pixel array PA300. For example, the readout unit 31*j*, in the second mode (sub-sampling mode), reads out a signal from pixels indicated in black in FIG. 9. FIG. 9 shows the configuration of the image sensor 3*j* in the fourth embodiment of the present invention.

In this way, in the sub-sampling mode in which pixels are sub-sampled from the pixel array PA300 and an image signal is only read from necessary predetermined pixels, a signal is not read from adjacent pixels in the pixel array PA300, so it is not possible to correct the signal of adjacent pixels. Therefore, in the second mode (sub-sampling mode), correction is performed in the following manner, while considering the output level of a signal that is adjacent in the read out image signal to be approximately the same as the output level of the signal of adjacent pixels that was not read out.

The signal processing circuit 7*j*, in the second mode, using pixels adjacent to the pixel for correction in an image signal of one frame that has been read out by the readout unit 31*j* as the adjacent pixels of the pixel for correction in the pixel array PA300, corrects the signal that has been read out from the pixel for correction. For example, the signal processing circuit 7*j*, when performing color mixture correction processing of a pixel X, corrects the signal of the pixel X using pixels LL, RR, UU, and DD as adjacent pixels of the pixel X.

Specifically, the following correction is performed. A signal that is read out from the pixel X is called SigX, and a signal that is read out from the pixel LL is called SigLL. A signal that is read out from the pixel RR is called SigRR, and a signal that is read out from the pixel UU is called SigUU. A signal that is read out from the pixel DD is called SigDD. As stated in the first embodiment, as color mixture correction coefficients that correspond to the pixel X, coefficients [x1], [x2], [x3], and [x4] that correct components that leak out from the pixel X, and coefficients [l2], [r1], [u4], and [d3] that correct components that leak in from pixels adjacent to the pixel X, are used. The signal processing circuit 7*j* performs correction by the calculation expressed in Formula 3, thus obtaining a corrected signal SigX'.

$$SigX' = SigX + SigX*([x1]+[x2]+[x3]+[x4]) - SigLL*[l2] - SigRR*[r1] - SigUU*[u4] - SigDD*[d3] \quad \text{Formula 3}$$

Next is a description of an image sensing apparatus 100*k* according to a fifth embodiment of the present invention. Below, portions that differ from the first embodiment will be mainly described.

The image sensing apparatus 100*k* is provided with an image sensor 3*k* and a signal processing circuit 7*k*.

Figure 10B:
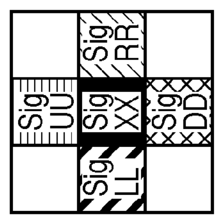
FIGS. 10A and 10B show the configuration and operation of an image sensor 3*k* in a fifth embodiment of the present invention.
Figure 10A:
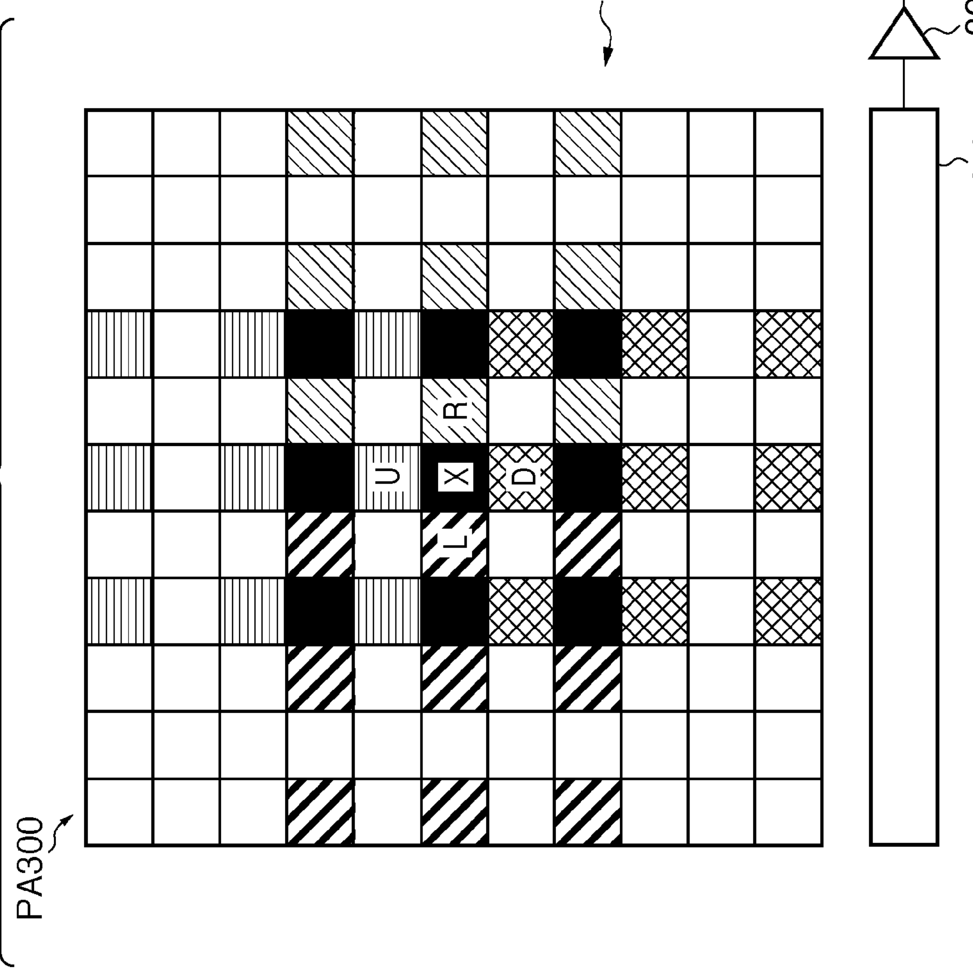

As shown in FIG. 10A, the image sensor 3*k* includes a readout unit 31*k*. The readout unit 31*k*, in a first mode (whole screen mode), reads out a signal from all of the pixels in the pixel array PA300, and in a third mode (addition mode), performs readout by adding together signals for each instance of at least two pixels of the same color that are positioned near each other in the pixel array PA300. For example, the readout unit 31*k*, in the third mode (addition mode), performs readout by adding together signals from pixels of the same color indicated in black in FIG. 10A. FIG. 10A shows the configuration and operation of the image sensor 3*k* in the fifth embodiment of the present invention.

Prior to performing color mixture correction in this way, for the pixel signal generated by each pixel of the image sensor, in the addition mode in which an image signal is generated after performing addition for each set of a predetermined number of pixels, the signals of a predetermined number of pixels having the same color on the image sensor are added together and the result is read out. Therefore, the signal of pixels adjacent to the pixel for color mixture correction cannot be used as-is for correction. Consequently, in the third mode (addition mode), correction is performed in the following manner, while considering that the amount of signal leakout to the respective adjacent pixels from the added pixels is about the same as the amount of leakout to adjacent pixels from a pixel positioned at the center of gravity of the added pixels.

The signal processing circuit 7*k*, in the third mode, corrects the signal that has been read out from the pixel for correction by the readout unit 31*k* using the position of the center of gravity of at least two pixels that are added together as the position of the pixel for correction in the pixel array PA300. For example, when the signal processing circuit 7*k* sums and averages the signals of the pixels indicated in black in FIG. 10A to obtain a signal SigXX shown in FIG. 10B, the signal SigXX of the pixel for correction is corrected using the position of the pixel X, which is the position of the center of gravity of the pixels indicated in black, as the position of the pixel for correction.

Specifically, the following correction is performed. The signals of the pixels indicated in black, including the pixel X, in FIG. 10A are summed and averaged to obtain the signal SigXX in FIG. 10B. The signals of the pixels indicated by the bold diagonal pattern, including the pixel L, in FIG. 10A are summed and averaged to obtain the signal SigLL in FIG. 10B. The signals of the pixels indicated by the diagonal line pattern, including the pixel R, in FIG. 10A are summed and averaged to obtain the signal SigRR in FIG. 10B. The signals of the pixels indicated by the horizontal line pattern, including the pixel U, in FIG. 10A are summed and averaged to obtain the signal SigUU in FIG. 10B. The signals of the pixels indicated by the lattice pattern, including the pixel D, in FIG. 10A are summed and averaged to obtain the signal SigDD in FIG. 10B. As stated in the first embodiment, as color mixture correction coefficients that correspond to the pixel X, coefficients [x1], [x2], [x3], and [x4] that correct components that leak out from the pixel X, and coefficients [l2], [r1], [u4], and [d3] that correct components that leak in from pixels adjacent to the pixel X, are used. The signal processing circuit 7*k* performs correction by the calculation expressed in Formula 4, thus obtaining a corrected signal SigXX'.

$$SigXX' = SigXX + SigXX*([x1]+[x2]+[x3]+[x4]) - SigLL*[l2] - SigRR*[r1] - SigUU*[u4] - SigDD*[d3] \quad \text{Formula 4}$$

Figure 11:
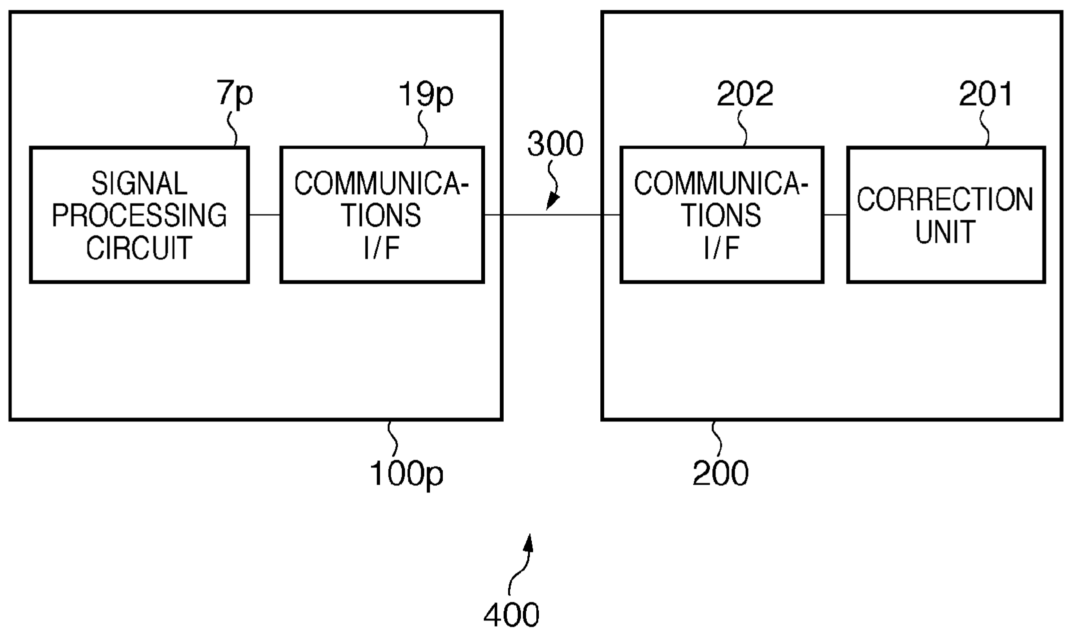
FIG. 11 shows the configuration of an image sensing system 400 that includes an image sensing apparatus 100*p* according to a sixth embodiment of the present invention.

Next is a description of an image sensing system 400 that includes an image sensing apparatus 100*p* according to a sixth embodiment of the present invention, with reference to FIG. 11. FIG. 11 shows the configuration of the image sensing system 400 including the image sensing apparatus 100*p* according to the sixth embodiment of the present invention. Below, portions that differ from the first embodiment will be mainly described.

The image sensing system 400 includes the image sensing apparatus 100*p* and a processing apparatus 200. The image sensing apparatus 100*p* is connected to the processing apparatus 200 via a communications line 300 so as to be capable of communications. The communications line 300, for example, is a wired communications line capable of serial communications such as a serial cable, or a wireless communications line employing Bluetooth or the like. The processing apparatus 200, for example, is a personal computer. The image sensing apparatus 100*p* supplies image data to the processing apparatus 200 via the communications line 300. The processing apparatus 200 receives image data from the image sensing apparatus 100*p*, and processes the received image data.

The image sensing apparatus 100*p* includes a signal processing circuit (generation unit) 7*p* and a communication interface (I/F) 19*p*.

In the present embodiment, the color mixture correction processing is performed not within the image sensing apparatus, but outside of the image sensing apparatus. When the color mixture correction processing is performed externally, it is necessary to output information that is necessary for performing correction along with the image data.

Figure 12:
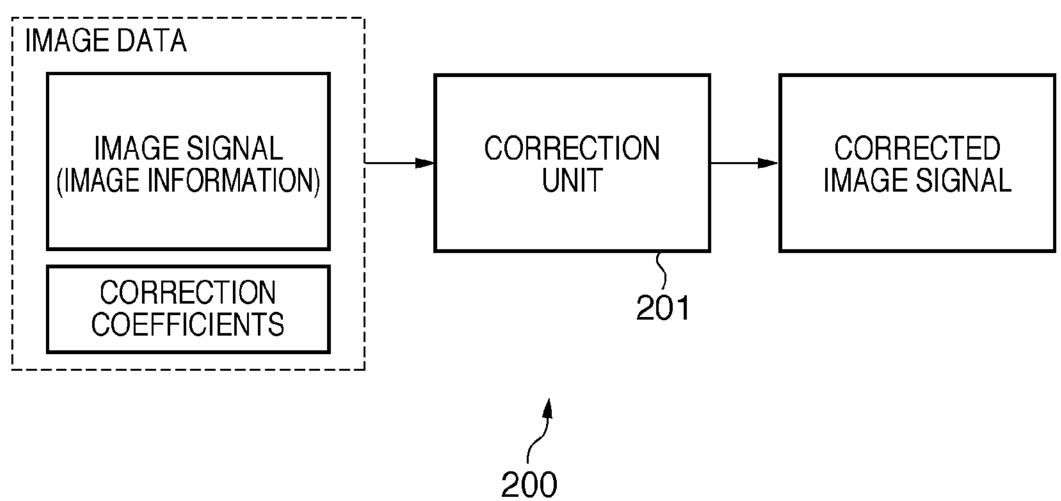
FIG. 12 is a dataflow diagram for a correction unit 201 in the sixth embodiment of the present invention.

Therefore, the signal processing circuit 7*p* generates image data by associating the position in the pixel array with the image signal of one frame that has been read out by the readout circuit, and also attaching the first characteristic of color mixture information and the second characteristic of color mixture information (see FIG. 12). The signal processing circuit 7*p* supplies the generated image data to the communication interface 19*p*.

The signal processing circuit 7*p* may attach to the image signal (image information) color mixture correction coefficients (or, color mixture correction data or a color mixture correction format) that match shooting conditions such as the lens F value, exit pupil distance, or zoom position. Alternatively, the signal processing circuit 7*p* may attach to the image signal (image information) information related to shooting conditions such as the lens F value, exit pupil distance, or zoom position.

The communication interface 19*p* sends the supplied image data to the processing apparatus 200 via the communications line 300.

The processing apparatus 200 is provided with a communication interface (I/F) 202 and a correction unit 201.

The communication interface 202 receives image data from the image sensing apparatus 100*p* via the communications line 300. The communication interface 202 supplies the received image data to the correction unit 201.

As shown in FIG. 12, the correction unit 201 receives image data from the communication interface 202. The correction unit 201 calculates the first correction coefficient for correcting a signal component that mixes into the pixel for correction from adjacent pixels according to the position of the pixel for correction in the pixel array indicated by the image data and the first characteristic of color mixture information. The correction unit 201 calculates the second correction coefficient for correcting a signal component that leaks out from the pixel for correction to an adjacent pixel according to the position of the pixel for correction in the pixel array indicated by the image data and the second characteristic of color mixture information. The correction unit 201 corrects the signal of the pixel for correction in the image data using the signals of pixels adjacent to the pixel for correction in the image data, the first correction coefficient, and the second correction coefficient. As shown in FIG. 12, the correction unit 201 outputs the corrected image signal to a later stage (for example, a recording medium such as a hard disk or a memory card). FIG. 12 is a dataflow diagram for the correction unit 201 in the sixth embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-305626, filed Nov. 28, 2008, which is hereby incorporated by reference herein in its entirety.

What is claimed is:

1. A signal processing apparatus that performs predetermined signal processing on an image signal output from an image sensor having a pixel array in which a plurality of pixels are arrayed in a direction along a row and a direction along a column, the signal processing apparatus comprising:

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal of the pixel for correction based on an output image signal of adjacent pixels of the pixel for correction and the calculated correction coefficient, wherein the characteristic information includes a coefficient table in which, for each pixel, a pixel position in the pixel array is associated with a correction coefficient that has been determined in advance so as to correct a signal component that mixes in each pixel from adjacent pixels, and the correction unit calculates the correction coefficient according to the position of the pixel for correction in the pixel array and the coefficient table.

2. A signal processing apparatus that performs predetermined signal processing on an image signal output from an image sensor having a pixel array in which a plurality of pixels are arrayed in a direction along a row and a direction along a column, the signal processing apparatus comprising:

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal of the pixel for correction based on an output image signal of adjacent pixels of the pixel for correction and the calculated correction coefficient, wherein the characteristic information includes a relational expression that indicates the relationship of the position of a pixel in the pixel array with a correction coefficient that has been determined in advance so as to correct a signal component that mixes in the pixel from adjacent pixels, and the correction unit calculates the correction coefficient according to the position of the pixel for correction in the pixel array and the relational expression.

3. A signal processing apparatus that performs predetermined signal processing on an image signal output from an image sensor having a pixel array in which a plurality of pixels are arrayed in a direction along a row and a direction along a column, the signal processing apparatus comprising:

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal of the pixel for correction based on an output image signal of adjacent pixels of the pixel for correction and the calculated correction coefficient, wherein the characteristic information includes:

a row relational expression that indicates the relationship of the position of a pixel in the direction along a row in the pixel array with a coefficient that has been determined in advance so as to correct a signal component that mixes in the pixel in a row that includes an optical center of the pixel array from adjacent pixels; and a column relational expression that indicates the relationship of the position of a pixel in the direction along a column in the pixel array with a coefficient that has been determined in advance so as to correct a signal component that mixes in the pixel in a column that includes the optical center of the pixel array from adjacent pixels; and the correction unit calculates the correction coefficient for the direction along a row according to the position in the direction along a row of the pixel for correction in the pixel array and the row relational expression, and calculates the correction coefficient for the direction along a column according to the position in the direction along a column of the pixel for correction in the pixel array and the column relational expression.

4. An image sensing apparatus, comprising:

an image sensor that has a pixel array in which a plurality of pixels are arrayed in a direction along a row and a direction along a column, and a readout unit that reads out a signal from the pixel array;

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal that has been read out from the pixel for correction by the readout unit based on an output image signal that has been read out from adjacent pixels of the pixel for correction by the readout unit and the calculated correction coefficient wherein the characteristic information includes a coefficient table in which, for each pixel, a pixel position in the pixel array is associated with a correction coefficient that has been determined in advance so as to correct a signal component that mixes in each pixel from adjacent pixels, and the correction unit calculates the correction coefficient according to the position of the pixel for correction in the pixel array and the coefficient table.

5. A method for signal processing of an image signal that is output from an image sensor in which a plurality of pixels are arrayed in a direction along a row and a direction along a column, the method comprising:

a first step of calculating, from characteristic information indicating characteristics of signal component mix in each pixel from adjacent pixels according to the pixel position in a pixel array of the image sensor that has been stored in advance, a correction coefficient according to the position of a pixel for correction in the pixel array; and a second step of correcting an output image signal of the pixel for correction based on an output image signal of adjacent pixels of the pixel for correction and the calculated correction coefficient, wherein the characteristic information includes a coefficient table in which, for each pixel, a pixel position in the pixel array is associated with a correction coefficient that has been determined in advance so as to correct a signal component that mixes in each pixel from adjacent pixels, and the first step calculates the correction coefficient according to the position of the pixel for correction in the pixel array and the coefficient table.

6. An image sensing apparatus, comprising:

an image sensor that has a pixel array in which a plurality of pixels are arrayed in a direction along a row and a direction along a column, and a readout unit that reads out a signal from the pixel array;

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal that has been read out from the pixel for correction by the readout unit based on an output image signal that has been read out from adjacent pixels of the pixel for correction by the readout unit and the calculated correction coefficient, wherein the characteristic information includes a relational expression that indicates the relationship of the position of a pixel in the pixel array with the correction coefficient that has been determined in advance so as to correct a signal component that mixes in the pixel from adjacent pixels, and the correction unit calculates the correction coefficient according to the position of the pixel for correction in the pixel array and the relational expression.

7. An image sensing apparatus, comprising:

an image sensor that has a pixel array in which a plurality of pixels are arrayed in a direction along a row and a direction along a column, and a readout unit that reads out a signal from the pixel array;

a storage unit that stores characteristic information indicating characteristics of signal component mix in each pixel from adjacent pixels according to the pixel position in the pixel array of the image sensor; and a correction unit that calculates a correction coefficient according to the position of a pixel for correction in the pixel array from the characteristic information, and corrects an output image signal that has been read out from the pixel for correction by the readout unit based on an output image signal that has been read out from adjacent pixels of the pixel for correction by the readout unit and the calculated correction coefficient, wherein the characteristic information includes:

a row relational expression that indicates the relationship of the position of a pixel in the direction along a row in the pixel array with a coefficient that has been determined in advance so as to correct a signal component that mixes in the pixel in a row that includes an optical center of the pixel array from adjacent pixels; and a column relational expression that indicates the relationship of the position of a pixel in the direction along a column in the pixel array with a coefficient that has been determined in advance so as to correct a signal component that mixes in the pixel in a column that includes the optical center of the pixel array from adjacent pixels; and the correction unit calculates the correction coefficient for the direction along a row according to the position in the direction along a row of the pixel for correction in the pixel array and the row relational expression, and calculates the correction coefficient for the direction along a column according to the position in the direction along a column of the pixel for correction in the pixel array and the column relational expression.

8. A method for signal processing of an image signal that is output from an image sensor in which a plurality of pixels are arrayed in a direction along a row and a direction along a column, the method comprising:

a first step of calculating, from characteristic information indicating characteristics of signal component mix in each pixel from adjacent pixels according to the pixel position in a pixel array of the image sensor that has been stored in advance, a correction coefficient according to the position of a pixel for correction in the pixel array; and a second step of correcting an output image signal of the pixel for correction based on an output image signal of adjacent pixels of the pixel for correction and the calculated correction coefficient, wherein the characteristic information includes a relational expression that indicates the relationship of the position of a pixel in the pixel array with the correction coefficient that has been determined in advance so as to correct a signal component that mixes in the pixel from adjacent pixels, and the first step calculates the correction coefficient according to the position of the pixel for correction in the pixel array and the relational expression.

9. A method for signal processing of an image signal that is output from an image sensor in which a plurality of pixels are arrayed in a direction along a row and a direction along a column, the method comprising:

a first step of calculating, from characteristic information indicating characteristics of signal component mix in each pixel from adjacent pixels according to the pixel position in a pixel array of the image sensor that has been stored in advance, a correction coefficient according to the position of a pixel for correction in the pixel array; and a second step of correcting an output image signal of the pixel for correction based on an output image signal of adjacent pixels of the pixel for correction and the calculated correction coefficient, wherein the characteristic information includes:

a row relational expression that indicates the relationship of the position of a pixel in the direction along a row in the pixel array with a coefficient that has been determined in advance so as to correct a signal component that mixes in the pixel in a row that includes an optical center of the pixel array from adjacent pixels; and a column relational expression that indicates the relationship of the position of a pixel in the direction along a column in the pixel array with a coefficient that has been determined in advance so as to correct a signal component that mixes in the pixel in a column that includes the optical center of the pixel array from adjacent pixels; and the first step calculates the correction coefficient for the direction along a row according to the position in the direction along a row of the pixel for correction in the pixel array and the row relational expression, and calculates the correction coefficient for the direction along a column according to the position in the direction along a column of the pixel for correction in the pixel array and the column relational expression.

* * * * *